(12) United States Patent
Beck et al.

(10) Patent No.: US 6,898,045 B2
(45) Date of Patent: May 24, 2005

(54) MEDIA WITH PRE-RECORDED ALIGNMENT TRANSITIONS

(75) Inventors: Patricia A. Beck, Palo Alto, CA (US); George M. Clifford, Jr., Los Altos Hills, CA (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 14 days.

(21) Appl. No.: 10/723,757

(22) Filed: Nov. 26, 2003

(65) Prior Publication Data

US 2004/0109257 A1 Jun. 10, 2004

Related U.S. Application Data

(62) Division of application No. 09/691,646, filed on Oct. 17, 2000, now Pat. No. 6,700,729.

(51) Int. Cl.[7] ............................. G11B 20/20; G11B 5/00; G11B 5/584
(52) U.S. Cl. ........................................ 360/76; 360/77.12
(58) Field of Search ............................... 360/72.1, 72.3, 360/74.1, 74.4, 75, 76, 77.01, 77.12, 78.01, 78.02, 78.03

(56) References Cited

U.S. PATENT DOCUMENTS 6,236,525 B1 * 5/2001 Cates et al. .................... 360/51
6,430,008 B1 * 8/2002 Trabert et al. ............... 360/317
6,433,949 B1 * 8/2002 Murphy et al. ................ 360/75

* cited by examiner

*Primary Examiner*—David Hudspeth
*Assistant Examiner*—Jason Olson
(74) *Attorney, Agent, or Firm*—Trueman H. Denny, III

(57) ABSTRACT

A device for precision alignment of a write element of a tape head to a transport direction of a media that is transported across the tape head is disclosed. The tape head includes at least one alignment element that is cofabricated with the write element so that both the write element and the alignment element have a fixed orientation with respect to a magnetic axis of the tape head. The alignment element and the write element can be fabricated on the tape head using standard microelectronic photolithographic processes. Preferably, the tape head includes a plurality of alignment elements. Those alignment elements are operative to write alignment transitions onto the media. The alignment transitions can be observed to determine if they are indicative of the write element having a predetermined orientation with respect to the transport direction. A read transducer can be used to generate signals from the alignment transitions and those signals can be analyzed to determine if the predetermined orientation of the write element has been achieved. The tape head can include horizontal and/or vertical elements for a gross visual alignment of the tape head to the media. The alignment transitions can be read by a data element of a separate data head. A signal from the data element can be used to adjust the azimuth of the data head with respect to a direction of transport. In servo writer applications where servo code is prerecorded on the media, the alignment transitions can be used to align the write elements of a servo write head to the transport direction of the media so that inter band skew between adjacent servo bands is significantly reduced.

17 Claims, 16 Drawing Sheets

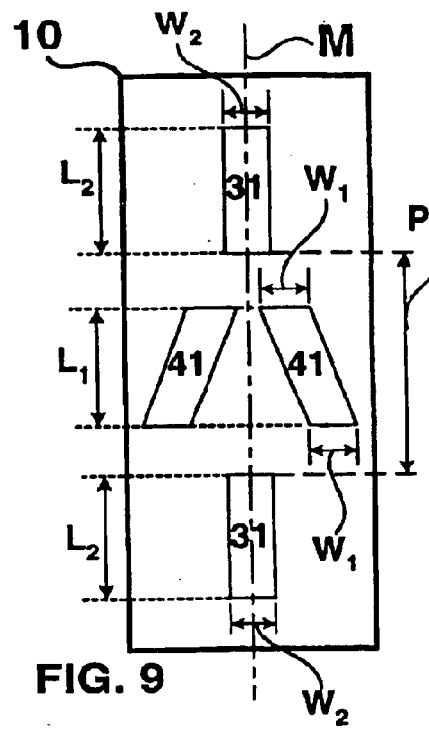
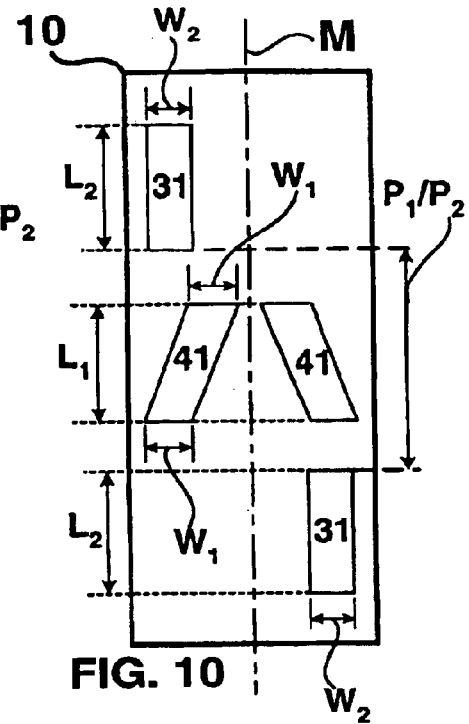
FIG. 9
FIG. 10
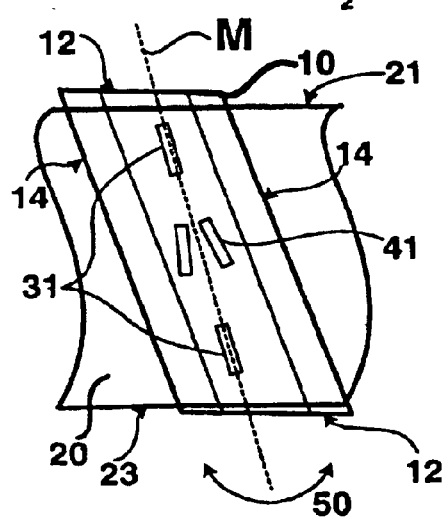
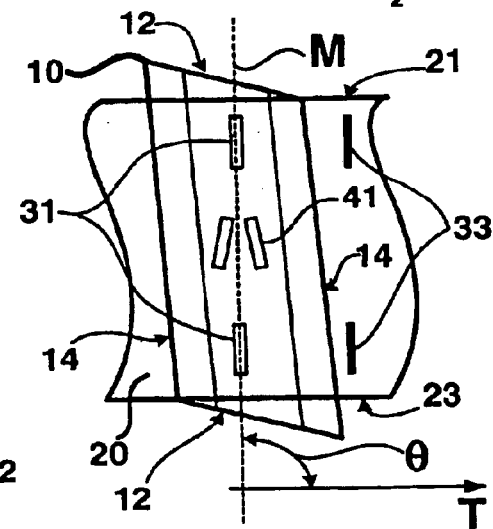
FIG. 11a
FIG. 11b

MEDIA WITH PRE-RECORDED ALIGNMENT TRANSITIONS

This application is a division of Ser. No. 09/691,646 filed Oct. 17, 2000 now U.S. Pat. No. 6,700,729.

FIELD OF THE INVENTION

The present invention relates generally to a tape head including at least one alignment element for precision alignment of the tape head with a transport direction of a media that is transported across the tape head. More specifically, the present invention relates to a tape head including at least one alignment element that is cofabricated with a write element of the tape head and aligned with a magnetic axis of the tape head so that the write element can be precisely aligned with a transport direction of a media that is transported across the tape head.

BACKGROUND ART

Servo writer heads that write servo code in one or more discrete servo bands along the entire length of a tape in a single pass are well known. The servo code is written on the tape by write elements (magnetic transducers) that are formed on the servo writer head. The write elements have a predetermined pattern such as a chevron pattern, for example. The servo bands are space apart by a pitch and areas between adjacent servo bands are reserved for uses such as data storage, for example. Typically, the servo code in at least two of the discrete servo bands is used to generate servo signals that are used to align data elements on a read/write head to a correct position for reading and writing data to one or more discrete data bands along the length of the tape. Those data bands are positioned in the area between the servo bands. The servo code is prerecorded on the tape during the manufacturing of the tape and the discrete servo bands are positioned at predetermined locations across a width of the tape. Those predetermined locations can be defined by a format specification for the tape. For instance, the format specification will determine the number of servo bands, the number of data bands, and their positions relative to one another across the width of the tape.

As more data is stored in the same amount of physical space on a tape, better reference and position accuracy is necessary. To increase the amount of data that is stored, a feature size of the write and data elements must be reduced to micron and submicron dimensions, resulting in an increase in the number of data bands that can be accommodated across the width of the tape. Servo-writing the tape requires increasingly more precision as the feature size of the write and data elements is decreased. As the servo code is written to the tape, the servo code should be centered on the patten of the write element and must be as perpendicular to a direction of tape travel as possible, for linear tape scans.

Ideally, as the tape is transported across the servo writer head, the patten for the write element should be precisely oriented with the direction of tape travel across the head. Typically, that orientation is perpendicular to the direction of tape travel. In most applications, the servo writer head is mounted in a fixture or jig such as a field replaceable unit (FRU), for example. The FRU positions the servo writer head in fixed orientation with the tape. The FRU can be designed to allow the position of servo writer head, the FRU, or both to be adjusted relative to the tape so that the servo writer head can be aligned with respect to the tape and/or the direction of tape travel.

Prior attempts to align the servo writer head include placing a visual indicator on the servo writer head. Typically, the visual indicator is placed so that it approximates the location of a magnetic axis of the servo writer head. The servo writer head is aligned by adjusting its azimuth relative to the tape until the visual indicator appears to be perpendicular to the direction of tape travel or perpendicular to one or both of the tapes edge's. Methods for forming the visual indicator include marking the servo writer head with a tool to form the visual indicator. For instance, a scribed mark (an incised mark) can be used to form the visual indicator.

Referring to FIGS. 1a and 1b, a prior art tape head 200 includes one or more write transducers 241 positioned along a magnetic axis 250 of the tape head 200. A tape 220 having opposed edges 221 and 223 is in contact with the tape head 200 and is transported across the tape head 200 in a direction of transport D. A visual indicator 215 is formed on the tape head 200 and is operative to define a gross point of reference on the tape head 200. Typically, the visual indicator 215 defines the approximate location of the magnetic axis 250. The position of the tape head 200 is adjusted 251 relative to the tape 220 until the visual indicator 215 appears to be approximately perpendicular to the direction of transport D as shown by angle $\alpha$, which represents an angle that is approximately 90 degrees. One disadvantage of the visual indicator 215 is that its location on the tape head 220 is only an approximation of the gross point of reference i.e. the magnetic axis 250. Because the visual indicator 215 is formed on the tape head 200 after the tape head 200 has been manufactured, it is extremely difficult if not impossible to precisely align the visual indicator 215 with the magnetic axis. Therefore, an axis 217 through the visual indicator 215 will not be colinear with the magnetic axis 250 thereby resulting in the magnetic axis 250 having an orientation angle $\alpha_3$ that is not perpendicular to the direction of transport D (i.e. $\alpha_3 \neq 90$ degrees). It is far more likely that the axis 217 will displaced from the magnetic axis 250 (see FIG. 1b) and be anti-parallel to the magnetic axis 250. Consequently, the visual indicator 215 is not an accurate indicator that can be used for precision alignment of the write transducers 241 with the direction of transport D. Moreover, if the write transducers 241 have feature sizes that are in the micron or submicron range, then even the slightest alignment error caused by the visual indicator 215 can result in a substantial misalignment of the write transducers 241 with the direction of transport D.

Prior attempts to align the servo writer head have also included using opposing sides of the servo writer head to align the servo writer head with the tape. This approach assumes that the opposing sides of the servo writer head were manufactured such that the opposing sides are parallel with each other and are parallel and/or perpendicular to the magnetic axis of the servo writer head. However, in reality, the servo writer head may be cut using a saw blade or the like. As a result, the opposing sides will not be exactly parallel to each other. For example, instead of having a rectangle shape, the servo writer head will have a parallelogram shape.

Referring to FIGS. 2a and 2b, a prior art tape head 300 includes opposing sides 301 and 303 that are not parallel to each other and are not parallel to or perpendicular to a magnetic axis 350 of the tape head 300 (i.e. the tape head 300 has a non-rectangular shape). The tape head 300 includes one or more write transducers 341 positioned along the magnetic axis 350. A tape 320 having opposed tape edges 321 and 323 is in contact with the tape head 300 and is transported across the tape head 300 in a direction of transport D. A side axis 305 on opposed edge 301 is adjusted 351 until it appears that either one or both of the opposed sides 301 are perpendicular with either one or both of the opposed tape edges (321 and 323) as indicated by an angle $\alpha_2$ in FIG. 2b. However, because the opposed sides 301 are not parallel to each other, the magnetic axis 350 is not perpendicular to the direction of transport D when it appears that angle $\alpha_2$ is perpendicular to the tape edges (321 and 323). It should be noted that this is due in part by the side axis 305 not being parallel to the magnetic axis 350. Consequently, the magnetic axis 350 makes an angle $\alpha_4$ that is not perpendicular to the direction of transport D (i.e. $\alpha_4 \neq 90$ degrees) when the side axis 305 is at the angle $\alpha_2$. Similarly, if opposing sides 303 are use to align the tape head 300 so that either one of the opposing sides 303 are parallel to either one or both of the opposed tape edges 321 and 323, the magnetic axis 350 will not be perpendicular to the direction of transport D when it appears that the opposing sides 301 are parallel to the tape edges (321 and 323). Therefore, if the magnetic axis 350 is not perpendicular to the direction of transport D, then the write transducers 341 are also not perpendicular to the direction of transport D.

In servo write head applications, the aforementioned alignment problems can result in azimuth errors in the servo code written onto the tape during manufacturing. For instance, in the Liner Tape Open format, the servo code is written on the tape in five bands. Alignment of the data head to the tape is achieved by using a band-to-band alignment between adjacent servo bands. The servo code in those adjacent servo bands is used to derive a position signal that is an average of the servo code in the adjacent bands. When the write transducers of the servo write head are not aligned with the direction of transport, the servo code in one of the adjacent servo bands will be written on the tape earlier than the servo code in another adjacent servo band (i.e. when viewed on the tape, one servo band will appear to be written earlier than the other servo band). Consequently, the servo code in the adjacent servo bands has a built-in azimuth error that skews (an inter band skew) the averages that are used to derive the position signal. The inter band skew can result in a band ID failure or the inter band skew can result in a longer time for the data head to position itself.

As was mentioned above, the decreasing feature size of the transducers requires greater alignment accuracy than can be achieved using the above mentioned prior art techniques. For instance, in same-surface-servo applications in which the servo code is prerecorded on the tape prior to data being written to or read from the tape, it is important that the servo code be precisely aligned with the tape such that the servo band is parallel to the direction of tape travel and the servo code is aligned perpendicular to the direction of tape travel. If the servo code is not precisely aligned with the tape, then the servo code can occupy and/or interfere with the data in adjacent data bands. Because the servo code is prerecorded on the tape before the data is written to the tape, the resulting misalignment can not be corrected after the tape has been manufactured. Therefore, it is essential to address precision alignment during the manufacturing process.

Therefore, there exists a need for precision alignment of a write element on a tape head with a transport direction of a tape that is transported across the tape head. Furthermore, there exists a need to precisely align a write element on a tape head with a transport direction of a tape that is transported across the tape head so that inter band skew is significantly reduced or eliminated. There also exists a need for gross alignment of the write element with the transport direction of the tape that is not dependent on opposing sides of the tape head being parallel or on physically marking the tape head. Finally, there is a need to align a tape head that reads and/or writes data to a tape with a transport direction of the tape.

SUMMARY OF THE INVENTION

Broadly, the present invention is embodied in a tape head including at least one write element and one or more alignment elements that are cofabricated with the write element. The alignment elements and the write element have a fixed orientation with respect to a magnetic axis of the tape head. Both the write element and the alignment elements are operative to generate a magnetic field induced by a write current supplied to the tape head. The magnetic field from the write element writes a plurality of write transitions in a write band on a media that is transported across the tape head in a transport direction. Similady, the magnetic field from each of the alignment elements writes a plurality alignment transitions in an alignment band on the media. Precision alignment of the write element to the transport direction can be accomplished by observing the alignment transitions in separate alignment bands and then adjusting a head-to-media angle between the magnetic axis and the transport direction until the observed alignment transitions are indicative of the write element being aligned with the transport direction.

In one embodiment of the present invention, the tape head included one alignment element that is cofabricated with the write element and both the write element and the alignment element have the fixed orientation with respect to a magnetic axis. The magnetic field from the alignment element writes a plurality alignment transitions in a single alignment band on the media. Precision alignment of the write element to the transport direction can be accomplished by observing the alignment transitions in the single alignment band and then adjusting a head-to-media angle between the magnetic axis and the transport direction until the observed alignment transitions are indicative of the write element being aligned with the transport direction.

The above mentioned alignment inaccuracies caused by the sides of the tape head not being parallel to each other are eliminated by the present invention because alignment of the write element to the transport direction is independent of the shape of the tape head. Therefore, the sides of the tape head need not be parallel to each other. Additionally, the alignment inaccuracies attributed to the visual indicator not being aligned with the magnetic axis are also eliminated by the present invention because alignment of the write element to the transport direction is determined by observing the alignment transitions on the media; therefore, the need for a crude visual indicator on the tape head is rendered moot.

Furthermore, the need for greater alignment accuracy and the need for better reference and position accuracy are addressed by the alignment elements of the present invention. Because both the write element and the alignment elements have a fixed orientation with respect to the magnetic axis, the orientation of the write element with the transport direction can be determined from the orientation of the alignment transitions that are written on the media.

Problems associated with inter band skew can be eliminated or significantly reduced by the alignment elements of the present invention because inter band skew is caused by misalignment of the write element with the transport direction. Consequently, azimuth error between servo bands is negligible when the write element is in alignment with the transport direction as indicated by the alignment transitions that are written on the media.

In another embodiment, the present invention can include horizontal and/or vertical elements that are cofabricated with the write element. The horizontal elements are parallel to one another and are perpendicular to the magnetic axis. A gross visual alignment of the tape head to opposed edges of the media can be accomplished by adjusting the head-to-media angle until the horizontal elements appear to be parallel to either one or both of the opposed edges of the media. The vertical elements are colinear with the magnetic axis and are a precise indication of the location of the magnetic axis so that a gross visual alignment of the tape head to the transport direction can be accomplished by adjusting the head-to-media angle until the vertical elements appear to be perpendicular to the transport direction or to either one or both of the opposed edges. The horizontal and vertical elements can be used individually or in combination to achieve the gross visual alignment.

The above mentioned problems with using a visual indicator are solved by the vertical elements of the present invention. First, the vertical elements are cofabricated with the write element and are colinear with the magnetic axis such that the vertical elements are an accurate visual indication of the location of the magnetic axis. Therefore, unlike the prior art visual indicator, it is not necessary to guess or approximate the location of the magnetic axis after the tape head has been manufactured. Second, since the vertical elements are colinear with the magnetic axis they are also parallel to the magnetic axis. Consequently, if the vertical elements are visually perpendicular to the transport direction or to either one or both of the opposed edges, then the magnetic axis is in a gross perpendicular alignment with the transport direction. Similarly, because the horizontal elements are perpendicular to the magnetic axis, if the horizontal elements are visually parallel to the opposed edges or to the transport direction, then the magnetic axis is also in the gross perpendicular alignment with the transport direction.

Moreover, the aforementioned problems with the sides of the tape head not being parallel to each other are rendered moot by the horizontal and vertical elements of the present invention because the gross alignment of the magnetic axis to the opposed tape edges and/or the transport direction is independent of the shape of the tape head or the lack of parallel sides for the tape head.

In yet another embodiment of the present invention, the alignment transitions generated by the alignment elements are used to effectuate the alignment of a tape head to a direction of media transport. A signal is derived from the alignment transitions and that signal is used to adjust the azimuth of a tape head with respect to the direction of media transport. The alignment transitions can occupy an area on the media that is predesignated for other uses and the alignment transition may subsequently be overwritten by the tape head.

Therefore, the need to align a tape head that reads and/or writes data to a tape with a transport direction of the tape is addressed by the alignment elements of the present invention. For example, during manufacturing of a tape to be used for data storage, a tape head including the alignment elements can be used to write alignment transitions on the tape. After manufacturing, the tape can be transported across a data head that is adapted to read and/or write data. The data head can include transducers that read the alignment transitions and a signal therefrom can be processed and used to adjust the azimuth of the data head so that the data head is aligned with the transport direction of the tape. The alignment transitions can be permanently written to the tape or they can be subsequently overwritten by the data head.

Other aspects and advantages of the present invention will become apparent from the following detailed description, taken in conjunction with the accompanying drawings, illustrating by way of example the principles of the present invention.

BRIEF DESCRIPTION OF THE DRAWINGS

FIGS. 9 and 10 illustrate length and line widths of an alignment element and a write element according to the present invention.

FIGS. 11a and 11b illustrate alignment of a tape head having sides that are not parallel to each other according to the present invention.

DETAILED DESCRIPTION

Figure 1B:
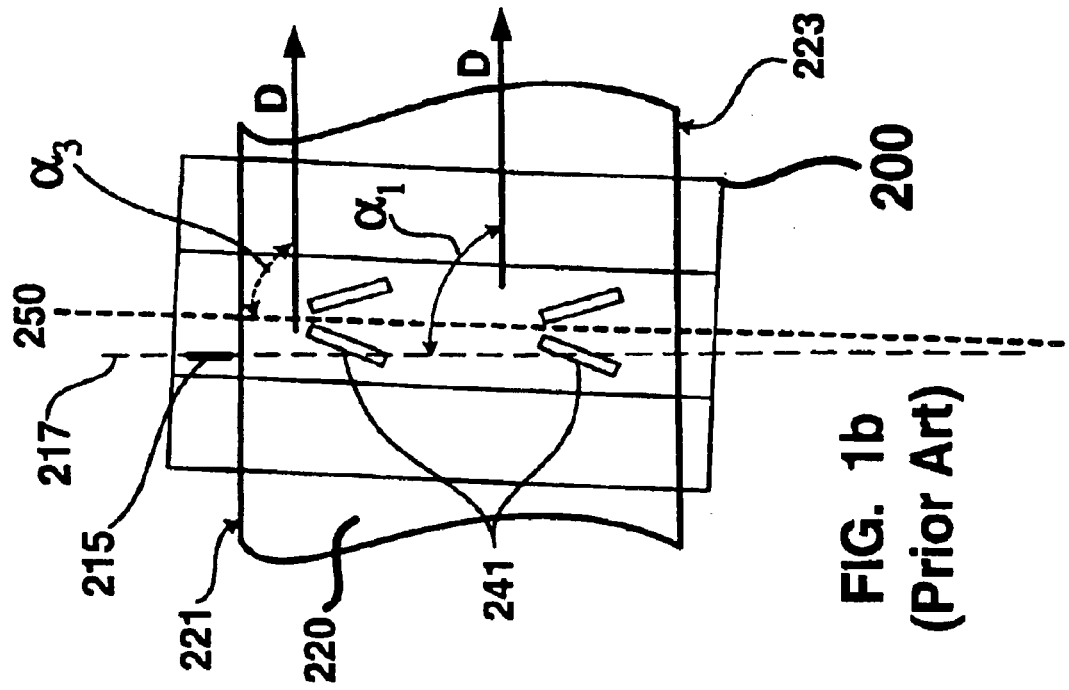
FIGS. 1a and 1b illustrate pre-alignment and post-alignment views of a prior art tape wherein a visual indicator is used for aligning the tape head.
Figure 1A:
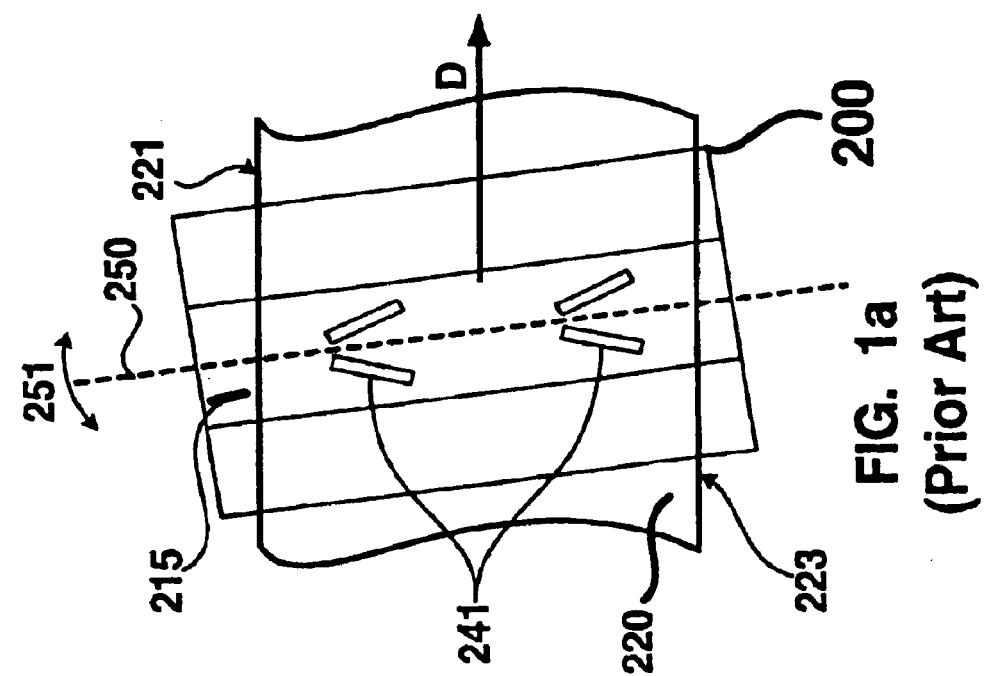
Figures 2A, 2B:
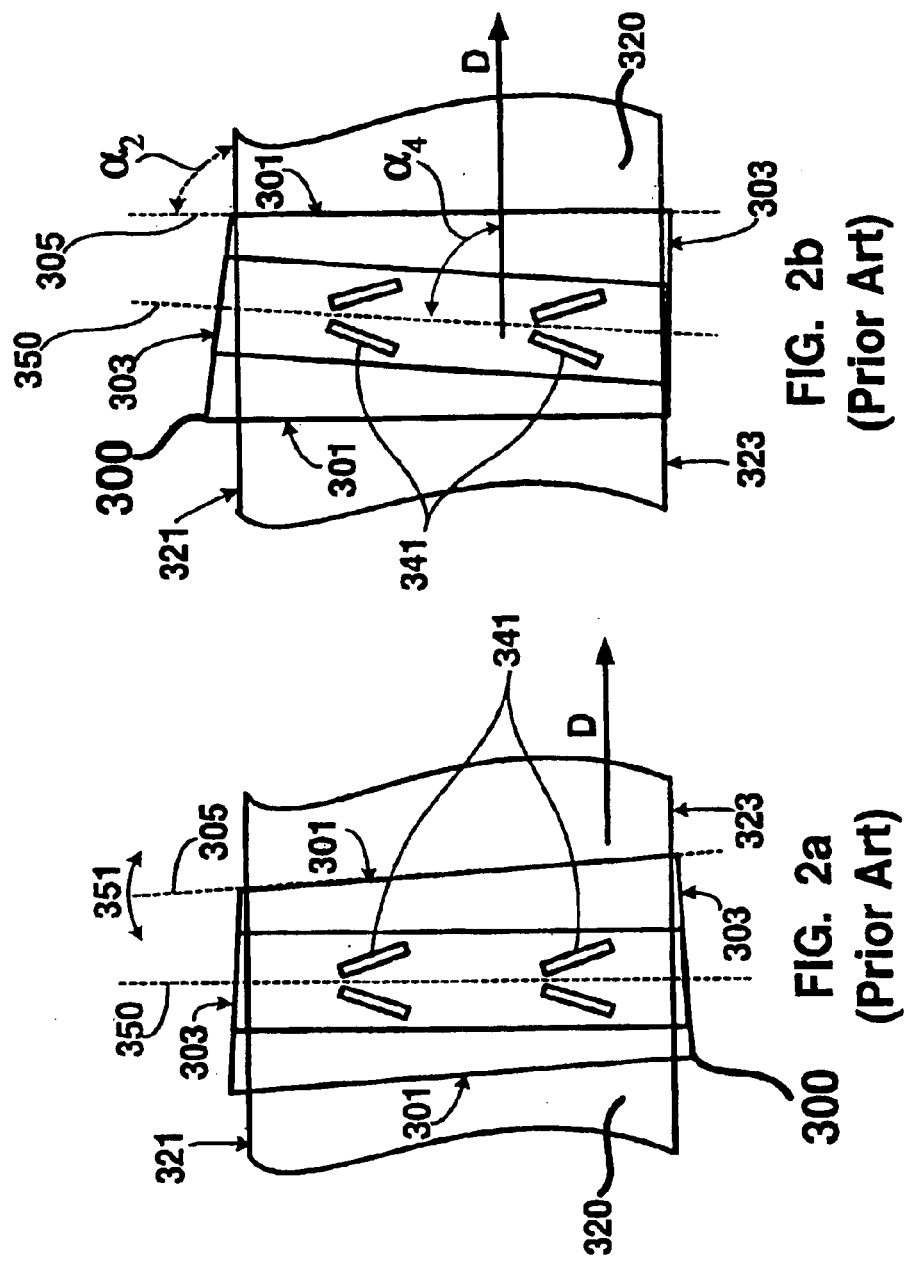
FIGS. 2a and 2b illustrate pre-alignment and post-alignment views of a prior art tape head wherein a side of the tape head is used for aligning the tape head.

In the following detailed description and in the several figures of the drawings, like elements are identified with like reference numerals.

As shown in the drawings for purpose of illustration, the present invention is embodied in a device for precision alignment of at least one write element of a tape head with a transport direction of a media that is transported across the tape head. The tape head includes at least one alignment element. The alignment element is cofabricated with the write element and both the alignment element and the write element have a first fixed orientation with respect to a magnetic axis of the tape head. Furthermore, the alignment element can be spaced apart from an adjacent alignment element by a first variable pitch. The write element and the alignment element generate a magnetic field induced by a write current supplied to the tape head. The magnetic field from the write element writes a plurality of written transitions on the media. Those written transitions define a write band on the media. Similarly, the magnetic field from the alignment element writes a plurality of alignment transitions on the media thereby defining an alignment band on the media. The alignment transitions have a recorded orientation with respect to the transport direction. The alignment element can be positioned relative to the write element so that the alignment transitions that are written on the media do not interfere with and do not overwrite the written transitions. Additionally, the alignment transitions can be positioned on the media so that they do not occupy an area on the media that has been predesignated for other uses. Precision alignment of the write element with the transport direction is obtained by observing the alignment transitions in the alignment band and adjusting a head-to-media angle between the magnetic axis of the tape head and the transport direction of the media until the recorded orientation of the alignment transitions is indicative of the write element having a preferred orientation with respect to the transport direction.

Figures 3, 3A, 3B, 3C:
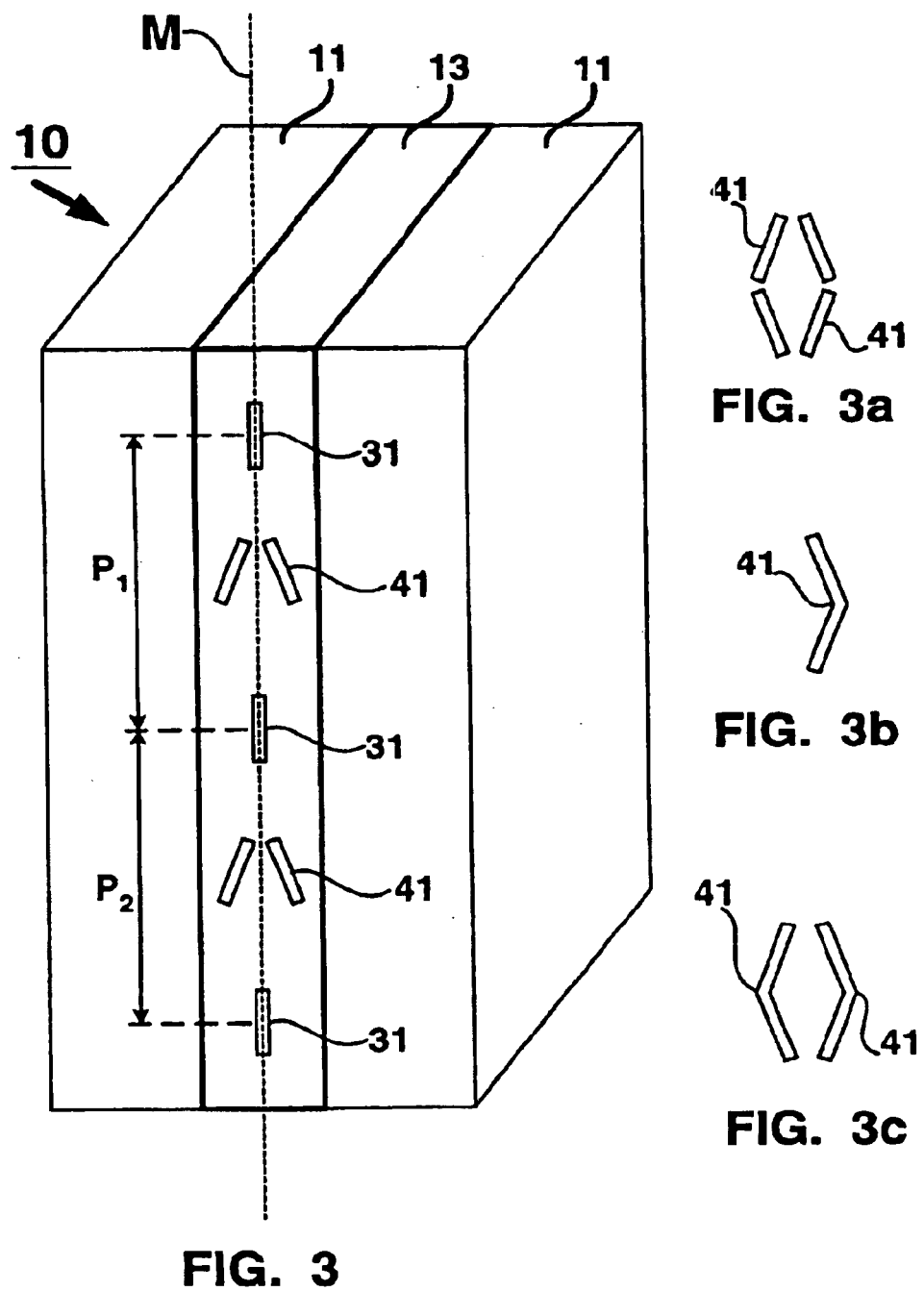
FIG. 3 is a profile view of a tape head including alignment elements according to the present invention.
FIGS. 3a through 3c illustrates shapes for a write element according to the present invention.

Reference is now made to FIGS. 3, 4, 5, and 6 in which a tape head 10 includes at least one write element 41 (two write elements 41 are illustrated) and at least one alignment element 31 (two are shown). The alignment elements 31 are cofabricated with the write elements 41 during the manufacture of the tape head 10 as will be discussed below. The alignment elements 31 are spaced apart from one another by a first variable pitch ($P_1$, $P_2$). The first variable pitch ($P_1$, $P_2$) can be measured between the centers of the alignment elements 31 (as illustrated in FIG. 3) or some other reference point can be selected for measuring the first variable pitch ($P_1$, $P_2$), such as the distance between the top of one alignment element 31 to the bottom of another alignment element 31, for example. In a preferred embodiment the first variable pitch ($P_1$, $P_2$) are equal to one another (i.e. $P_1=P_2$); however, the first variable pitch ($P_1$, $P_2$) need not be equal and can vary between the alignment elements 31. For instance, the pitch $P_1$ can be larger than the pitch $P_2$ or vice versa. The alignment elements 31 and the write elements 41 are adapted to generate a magnetic field (not shown). The magnetic field is induced by a write current (not shown) supplied to the tape head 10. The principles and electronics necessary to supply the write current are well understood in the tape head art. For example, a conductor (not shown) can be routed through an aperture (not shown) formed in the tape head 10 to form a coil. A current supplied to the conductor can induce the magnetic field.

Figure 4:
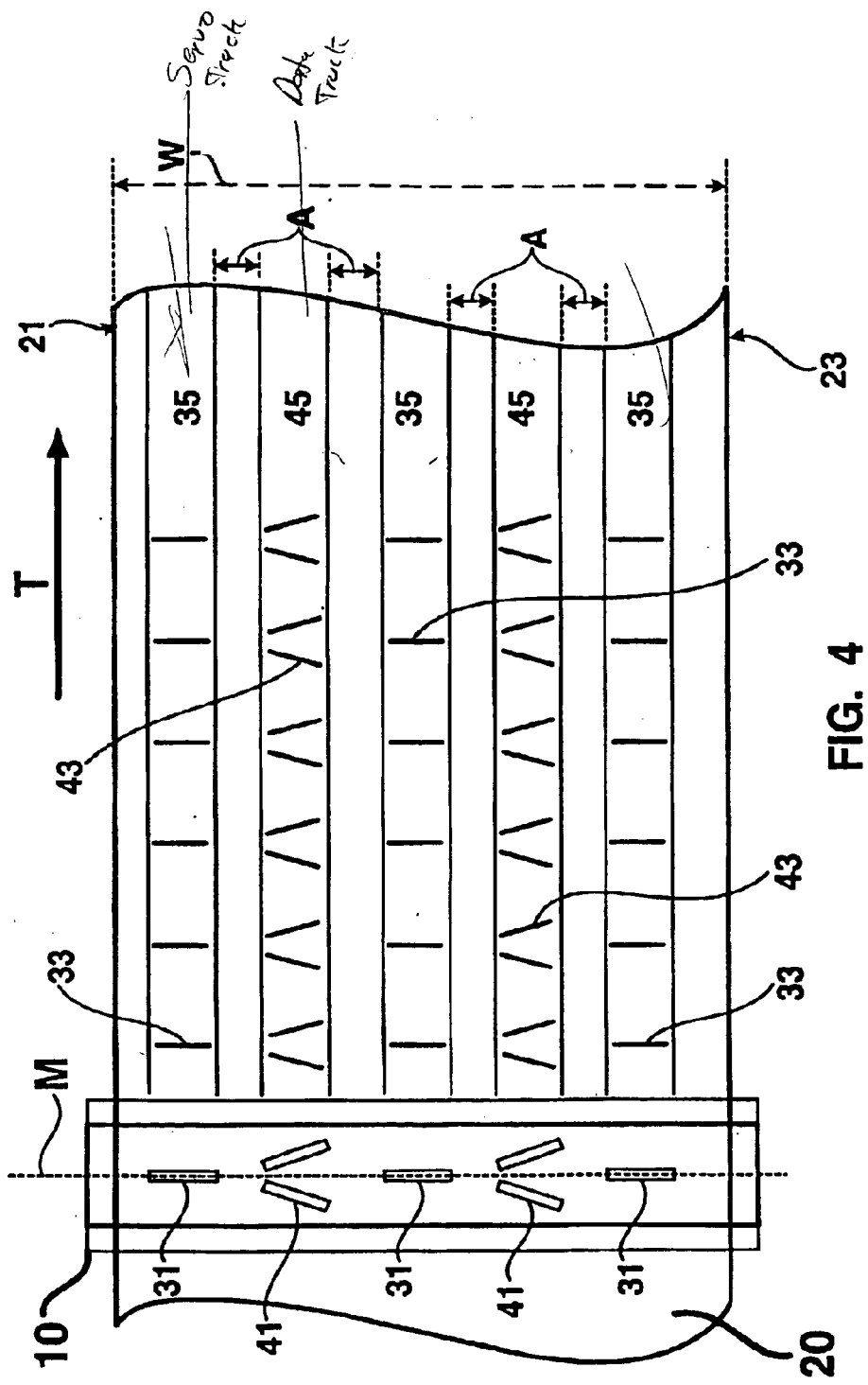
FIG. 4 illustrates the writing of alignment transitions and write transitions on a media according to the present invention.

In FIG. 4, the magnetic field from the write elements 41 write a plurality of written transitions 43 on a media 20. The media 20 includes opposed edges 21 and 23 and is transported across the tape head 10 in a transport direction T. The media 20 can be a magnetic tape such as the type used in data storage applications, for example. The write transitions 43 define a write band 45 on the media 20. Similarly, the magnetic field from the alignment elements 31 write a plurality of alignment transitions 33 on the media 20. The alignment transitions 33 define an alignment band 35 on the media 20. Although the transport direction T is illustrated as traveling across the tape head 10 in a left-to-right direction, the principles of the present invention apply to a right-to-left direction of transport as well. The alignment elements 31 can be positioned relative to the write elements 41 so that the alignment transitions 33 that are written onto the media 20 do not interfere with and do not overwrite the written transitions 43. Furthermore, the alignment transitions 33 can be positioned on the media 20 so that the alignment transitions 33 do not occupy an area A (four are shown) on the media 20 predesignated for other uses.

Applications for the area A include compliance with a format specification for data storage on a magnetic tape. For instance, the format specification can include a Liner Tape-Open format (LTO), an ULTRIUM™ format, a TRAVAN™ format, and a MAGSTART™ MP 3570 format. In a format specification for a typical high density tape storage application, the area A can include a plurality of data bands. Each data band contains data that is written to the data band or is read from the data band using a data head. In servo write head applications in which the write elements 41 write servo code on the media 20, it is well understood in the art that the written transitions 43 that comprise the servo code do not interfere with and do not overwrite the data in the data bands. Accordingly, the positions of the write bands 45, the alignment bands 35, and any data bands relative to one another on the media 20 will be defined by the format specification.

In one embodiment of the present invention, written transitions 43 comprise servo code that is prerecorded on the media 20. The servo code can be prerecorded as part of a manufacturing process. The servo code occupies the write band 45 such that the write band 45 is effectively a servo band that is parallel to the transport direction T. The area A can include the servo band such that the alignment transitions 33 do not overwrite the servo code and the alignment transitions 33 do not interfere with the servo code. Interference with the servo code can occur if the alignment transitions 33 are so close in proximity to the servo code that the magnetic field from the alignment transitions 33 interacts with the servo code thereby overwriting, erasing, or corrupting the servo code. The format specification should be designed to prevent adverse interactions between the alignment transitions 33 and the servo code.

Figure 5:
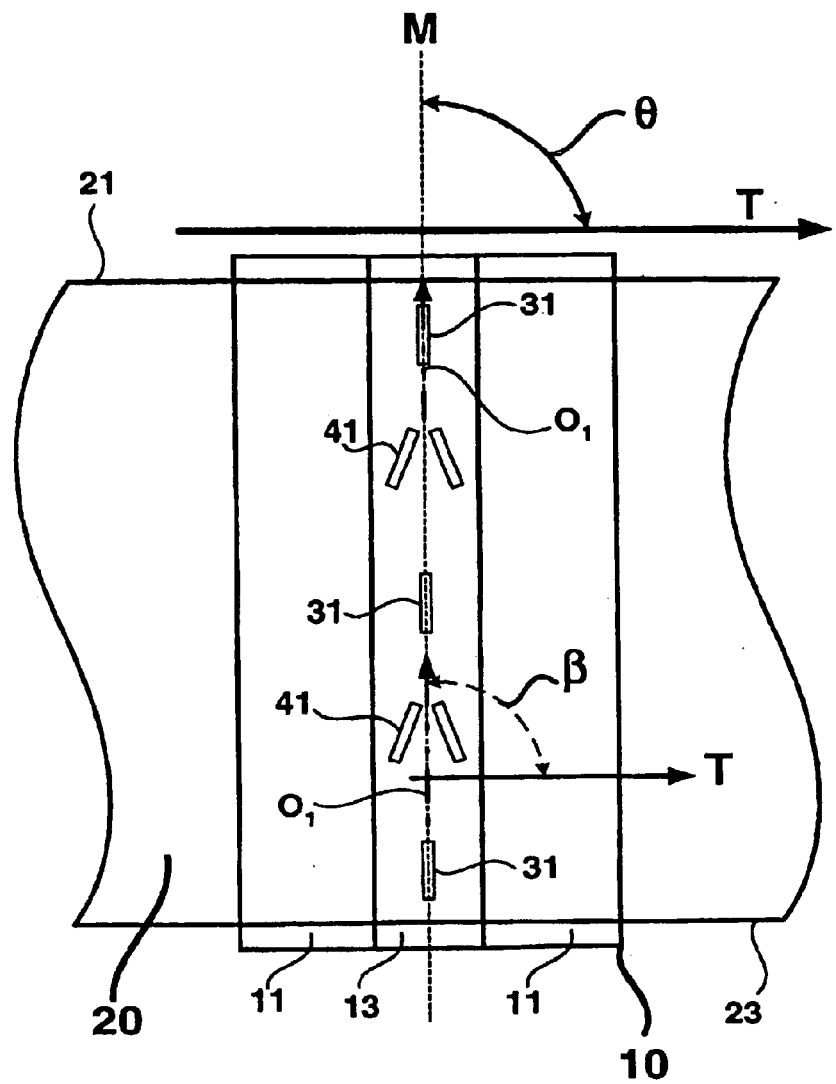
FIGS. 5 and 6 illustrates a first fixed orientation and a preferred orientation according to the present invention.

The first fixed orientation $O_1$ can be colinear with the magnetic axis M so that the alignment elements 31 are colinear with one another and are aligned along the magnetic axis M (see FIGS. 3 and 5). On the other hand, the first fixed orientation $O_1$ can be parallel to the magnetic axis M with the alignment elements 31 having a position that is offset from the magnetic axis M as illustrated by parallel axes $A_1$ and $A_2$ in FIG. 6. The alignment elements 31 that are positioned along an identical one of the parallel axes ($A_1$ and $A_2$) are colinear with each other (see axis $A_1$).

Reference is now made to FIGS. 5, 6, 7a, 7b, 8a, and 8b in which the media 20 is transported across the tape head 10 in the transport direction T. The write elements 41 can be precisely aligned with the transport direction T by observing the alignment transitions 33 that are written onto the media 20 by the alignment elements 31 (see FIG. 4) and adjusting a head-to-media angle θ between the magnetic axis M and the transport direction T until a recorded orientation $\Delta_1$ of the alignment transitions 33 in the separate alignment bands 35 (see FIGS. 7a, 7b, 8a, and 8b) are indicative of the write element 41 having a preferred orientation β with respect to the transport direction T (see FIGS. 5 and 6). Therefore, as the head-to-media angle θ is adjusted from $θ_1$ to $θ_2$ as the media 20 is transported across the tape head 10, the recorded orientation $\Delta_1$ of the alignment transitions 33 changes from $\Delta_1$ to $\Delta_2$ as illustrated in FIGS. 7a and 7b, and FIGS. 8a and 8b.

In one embodiment of the present invention, the preferred orientation β is perpendicular to the transport direction T and the head-to-media angle $θ_2$ is 90 degrees. Because the first fixed orientation $O_1$ is colinear with the magnetic axis M the preferred orientation β is also 90 degrees when the head-to-media angle $θ_2$ is 90 degrees. Furthermore, the recorded orientation $\Delta_2$ is also 90 degrees when the head-to-media angle $θ_2$ is 90 degrees. However, the present invention is not to be construed as being limited to the angles illustrated or described herein. The preferred orientation β, the recorded orientation Δ, and the head-to-media angle θ can be an angle other than 90 degrees. Moreover, there is no need for the angles to be identical to one another. For instance, when the head-to-media angle θ is 90 degrees, the recorded orientation Δ can be 45 degrees, and the preferred orientation β can be 60 degrees. The actual relationships between the preferred orientation β, the recorded orientation Δ, and the head-to-media angle θ will be application dependent.

Figure 7A:
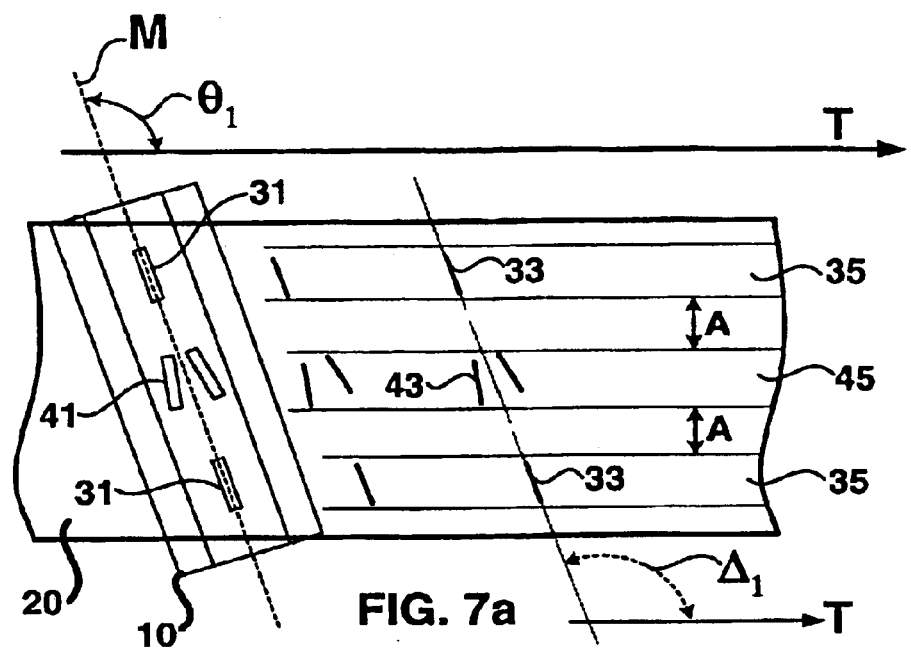
FIGS. 7a, 7b, 8a, and 8b illustrate a recorded orientation before and after alignment according to the present invention.
Figure 7B:
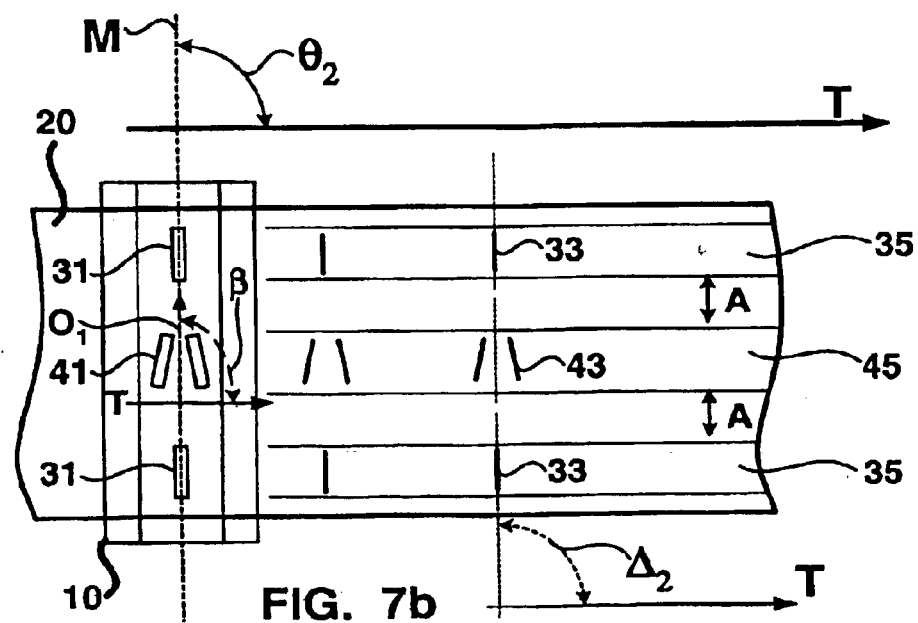

In another embodiment of the present, as illustrated in FIGS. 5 and 7b, the first fixed orientation $O_1$ is colinear with the magnetic axis M such that the alignment elements 31 are colinear with one another and are aligned along the magnetic axis M. Therefore, when the recorded orientation $\Delta_2$ is perpendicular to the transport direction T, the alignment transitions 33 in adjacent alignment bands 35 are colinear with one another when the magnetic axis M is in a near perfect perpendicular alignment with the transport direction T (i.e. $θ_2$ is 90 degrees).

Figure 6:
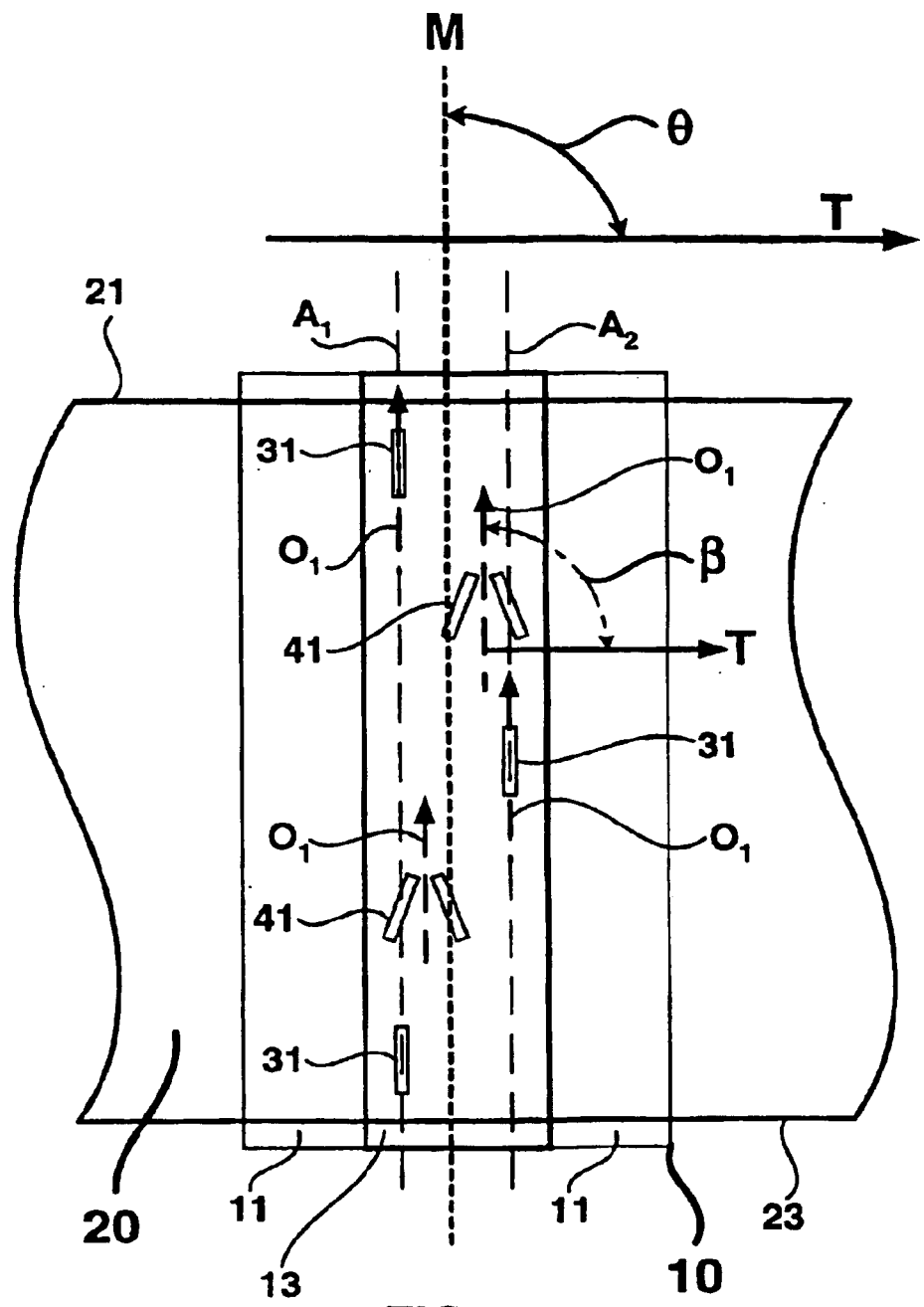
Figure 8A:
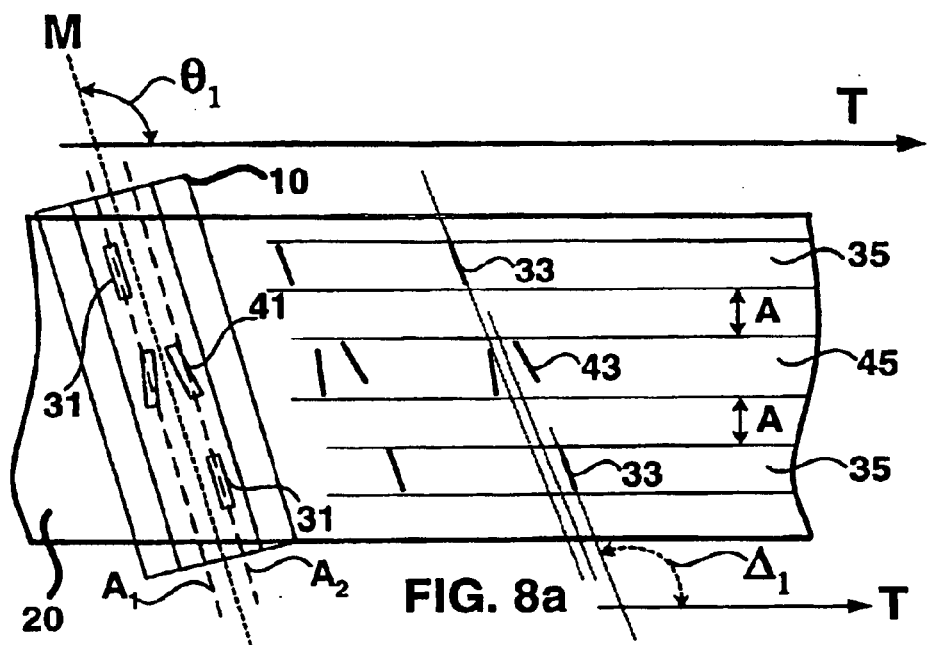
Figure 8B:
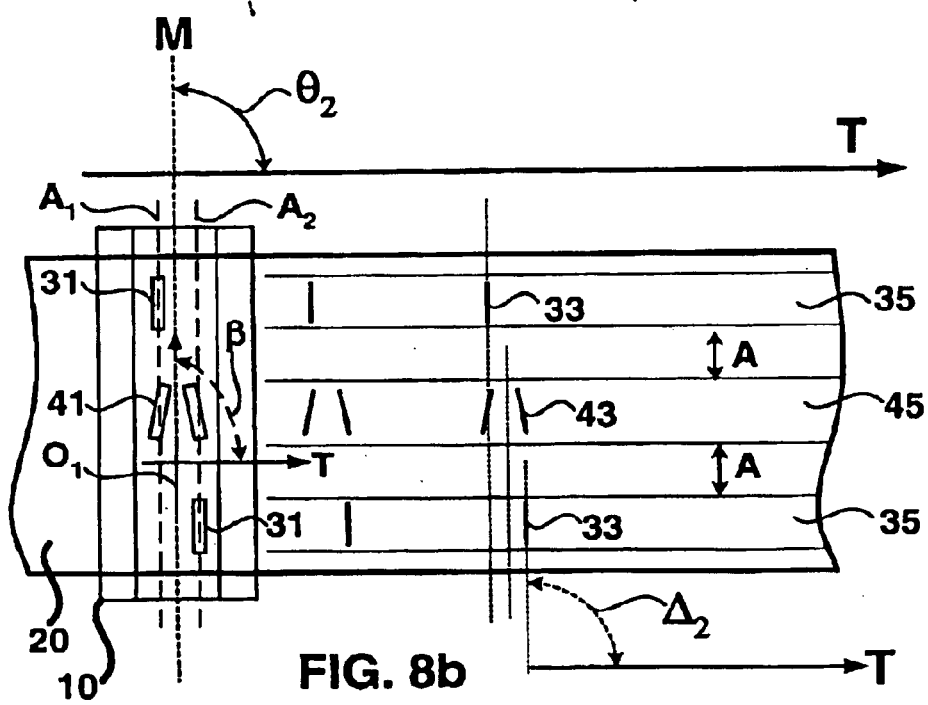

Referring to FIGS. 6 and 8b, in yet another embodiment of the present invention, the first fixed orientation $O_1$ is parallel to the magnetic axis M as illustrated by parallel axes $A_1$ and $A_2$ in FIG. 6. The alignment elements 31 that are positioned along identical parallel axes are colinear with one another and are parallel to the magnetic axis M (see axis $A_t$). Consequently, when the recorded orientation $\Delta_2$ is perpendicular to the transport direction T, the alignment transitions 33 written by the alignment elements 31 positioned along the identical parallel axes (see axis $A_1$) are colinear with one another when the magnetic axis M is in the near perfect perpendicular alignment with the transport direction (i.e. $\theta_2$ is 90 degrees).

In FIGS. 9 and 10, the alignment elements 31 can have a length $L_2$ that is from about 10.0 μm long to about 300.0 μm long. The actual length $L_2$ will depend on the application and on the desired size for the alignment transitions 33 that are written onto the media 20. In particular, the length $L_2$ may be determined by the ability of a read transducer to read the alignment transitions 33 as will be discussed below. The length $L_2$ of the alignment elements 31 need not be identical, that is the two alignment elements 31 illustrated in FIGS. 9 and 10 can have different lengths $L_2$. Preferably, the length $L_2$ is identical for all the alignment elements 31 so that the alignment transitions 33 will be uniform in size and shape. Additionally, read transducers on a read head can be consistently sized to read the alignment transitions as will be discussed below.

The alignment elements 31 can have a line width $W_2$ that is less than 1.0 μm (i.e. $W_2 < 1.0$ μm), or the alignment elements 31 can have a line width $W_2$ that is greater than or equal to 1.0 μm (i.e. $W_2 \geq 1.0$ μm).

In one embodiment of the present invention, the write elements 41 have a first line width $W_1$ and a first length $L_1$ as illustrated in FIGS. 9 and 10. The line width $W_2$ of the alignment elements 31 is less than or equal to the first line width W1 of the write elements 41 (i.e. $W_2 \leq W_1$). In another embodiment, the first line width $W_1$ can be less than 1.0 μm (i.e. $W_1 < 1.0$ μm), or the first line width $W_1$ can be greater than or equal to 1.0 μm (i.e. $W_1 \geq 1.0$ μm). The write elements 41 can have a first length $L_1$ that is from about 10.0 μm long to about 300.0 μm long. FIGS. 9 and 10 also illustrate that the first variable pitch ($P_1$, $P_2$) can be measured from the top of one alignment element 31 to the bottom of another alignment element 31.

The alignment elements 31 and the write elements 41 can be formed on the tape head 10 using photolithographic techniques that are well understood in the art. For instance, it is well known in the art to use photolithography to form the read transducer and write transducer for a thin film magnetoresistive tape head.

Advantages to using photolithography to form the alignment elements 31 and the write elements 41 include the ability to position the alignment elements 31 and the write elements 41 relative to one another and to the magnetic axis M with photolithographic precision. As a result, the first fixed orientation $O_1$ can be determined with great precision. For instance, the first fixed orientation $O_1$ can be set to 90 degrees for the alignment elements 31 and 45 degrees for the write elements 41. A CAD tool can be used to electronically draw the pattern (i.e. the shape), the size (i.e. width and height), and to determine the location of the alignment elements 31 and the write elements 41. For example, the magnetic axis M can be a predetermined line in a CAD layout that determines the position and orientation of the alignment elements 31 and the write elements 41 relative to the predetermined line (the magnetic axis M). Therefore, in FIGS. 9 and 10, the alignment elements 31 can be placed so that they are colinear (see FIG. 9), parallel (see FIG. 10), or are oriented at any given angle with respect to the magnetic axis M.

Accordingly, in FIGS. 11a and 11b, the tape head 10 has a polygonal shape with opposing sides 12 and 14 that are not parallel to each other (i.e. the tape head 10 does not have a rectangular shape). An attempt to align sides 14 so that they appear perpendicular to the transport direction T would not result in the head-to-media angle θ being perpendicular to the transport direction T because this alignment technique assumes that the magnetic axis M is parallel to sides 14, which it is not. Similarly, an attempt to align sides 12 so that they appear parallel to the opposed edges 21 and 23 of the media 20 would not result in the head-to-media angle θ being perpendicular to the transport direction T because it is assumed that the magnetic axis M is perpendicular to sides 12, which it is not. Therefore, the alignment elements 31 of the present invention are an improvement over prior techniques that relied upon assumed relationships between the sides of a tape head and its magnetic axis. Consequently, in FIGS. 11a and 11b, the tape head 10 can be adjusted 50 and the alignment transitions 33 observed until the head-to-media angle θ is perpendicular to the transport direction T irregardless of any non-uniformities in the shape of the tape head 10.

Moreover, if the tape head 10 has sides 12 and 14 that are parallel to each other and the magnetic axis M is not parallel to sides 14 and/or is not perpendicular to sides 12, the principles of the present invention will nevertheless result in alignment of the magnetic axis M with the transport direction T because it is by observing the recorded orientation Δ of the alignment transitions 33 that determines when alignment between the magnetic axis M and the transport direction T has occurred. Since the first fixed orientation $O_1$ is established during manufacture of the tape head 10, the recorded orientation Δ of the alignment transitions 33 is an accurate indicator of the orientation of the write element 41 with respect to the transport direction T and the orientation of the written transitions 43 with respect to the transport direction T.

In one embodiment of the present invention, the recorded orientation Δ of the alignment transitions 33 is observed by applying a magnetically reactive material (not shown) to the media 20 after the alignment transitions 33 have been written onto at least a portion of the media 20. The magnetically reactive material is applied to that portion of the media 20 having the alignment transitions 33 so that the alignment transitions 33 are rendered visible by the magnetically reactive material. Once rendered visible, the orientation of the alignment transitions 33 can be compared to a reference point. For instance, the opposed tape edges (21,23) or the transport direction T can be used as the reference point. Depending on the width of the media 20 and the size of the alignment transitions 33, it may be necessary to use a magnifying device to see the alignment transitions 33 and to compare them against the reference point. For example, if the desired recorded orientation Δ is perpendicular to the opposed tape edges (21,23), then the alignment transitions 33 should be perpendicular to those edges. If the alignment transitions 33 are not perpendicular, then the head-to-media angle θ is adjusted in a manner calculated to bring the recorded orientation Δ into perpendicular alignment with the opposed edges (21,23) and/or the transport direction T. The above process can be repeated until the recorded orientation Δ is perpendicular to the opposed tape edges (21,23). The magnetically reactive material includes but is not limited to ferromagnetic particles and ferrofluid, for example. Preferably, ferrofluid is used to coat a portion of the media 20 to render visible the alignment transitions 33.

Figure 12:
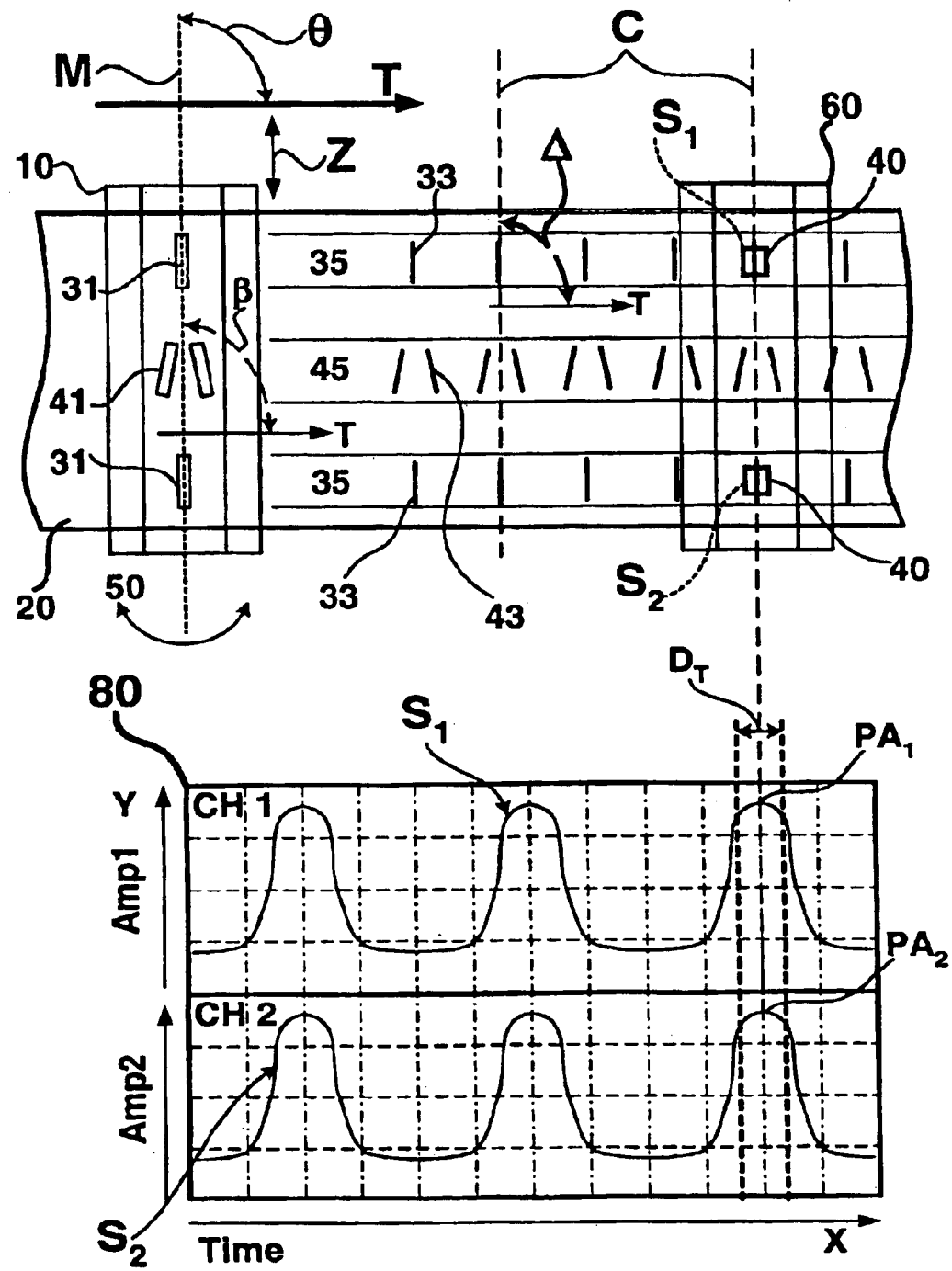
FIG. 12 is an illustration of a read head for observing alignment transitions according to the present invention.

In another embodiment of the present invention, as illustrated in FIG. 12, the alignment transitions 33 are observed by a separate read head 60 having a first read element 40 (two are shown) that is adapted to read a first electrical signal $S_1$ (illustrated as a dashed line). The read head 60 is in contact (the contact may be direct or proximate) with the media 20 and the first electrical signal $S_1$ is generated by the alignment transitions 33 that pass over the first read element 40 as the media 20 is transported across the read head 60 in the transport direction T. The head-to-media angle θ is adjusted 50 until the first electrical signal $S_1$ matches a predetermined signature (electrical or electronic) that is indicative of the recorded orientation Δ having a preferred alignment with respect to the transport direction T. Consequently, the predetermined signature is also indicative of the write elements 41 having the preferred orientation β with respect to the transport direction T. The first electrical signal $S_1$ can be observed on a display 80 of a signal measuring instrument, such as an oscilloscope that is in electrical communication with the read head 60, for example. In FIG. 12, the first electrical signal $S_1$ is observed on channel one CH1 of the display 80 of an oscilloscope (not shown). The display 80 illustrates time on a x-axis X and an amplitude Amp1 of the first electrical signal $S_1$ on a y-axis Y. The amplitude Amp1 can be a measure of a read current generated by the first read element 40, for example. The first electrical signal $S_1$ can have a Lorentzian distribution and peak detection can be used to determine if a peak amplitude $PA_1$ of the first electrical signal $S_1$ matches the predetermined signature.

In yet another embodiment of the present invention, the read head 60 can include at least a second read element 40 adapted to read a second electrical signal $S_2$ (illustrated as a dashed line) generated by the alignment transitions 33 in an adjacent alignment band 35. The head-to-media angle θ is adjusted 50 until the first and second electrical signals ($S_1$ and $S_2$) match the predetermined signature. As mentioned above, the predetermined signature is also indicative of the write elements 41 having the preferred orientation β with respect to the transport direction T. The first and second electrical signals ($S_1$ and $S_2$) can be observed on the display 80, for example. In FIG. 12, the first electrical signal $S_1$ is observed on channel one CH1 and the second electrical signal $S_2$ is observed on channel two CH2. The predetermined signature can be the peak amplitude $PA^1$ of the first signal $S_1$ and a peak amplitude $PA_2$ of the second electrical signal $S_2$ occurring nearly simultaneously in time within an acceptable tolerance $D_T$. For instance, The first and second electrical signals ($S_1$ and $S_2$) can have a Lorentzian distribution and peak detection can be used to determine if the peak amplitudes ($PA_1$ and $PA_2$) match the predetermined signature.

Ideally, when the alignment transitions 33 are colinear with one another and the recorded orientation Δ has the preferred alignment (Δ=90 degrees) with the transport direction T as illustrated by axis C, the peak amplitudes $PA_1$ and $PA_1$ will occur nearly simultaneously as illustrated in FIG. 12. However, the peak amplitudes $PA_1$ and $PA_1$ of the first and second electrical signals ($S_1$ and $S_2$) may occur within an acceptable window of time as indicated by the acceptable tolerance $D_T$.

On the other hand, when the alignment transitions 33 are not colinear with one another such that Δ≠90 degrees (see FIG. 7a), then the peak amplitudes $PA_1$ and $PA_1$ of the first and second electrical signals ($S_1$ and $S_2$) will be shifted in time relative to each other so that $PA_1$ will occur before or after $PA_2$ or vice versa. In any event, the degree to which that time shift is acceptable will be application specific and the acceptable tolerance $D_T$ is a time difference that defines what is an acceptable time shift for a given application.

Although the preferred alignment is perpendicular to the transport direction (i.e. the recorded orientation Δ=90 degrees in FIG. 12), the preferred alignment need not be 90 degrees with respect to the transport direction T. As was stated above, other angles for the recorded orientation Δ can satisfy the conditions for the preferred alignment. Additionally, it will be understood by one skilled in the art, that methods other than those illustrated in FIG. 12 can be used to observe the alignment transitions 33. For instance, the first signal and/or second electrical signals ($S_1$ and $S_2$) can be connected with a system for converting the signals into the digital domain (e.g. using a digital-to-analog converter) so that the signals can be processed by a computer (CPU) or a DSP. An algorithm running on the CPU/DSP could determine when the first electrical signal $S_1$ and/or the second signal $S_2$ match the predetermined signature. Output signals from the system can be used to adjust 50 the head-to-media angle θ until the predetermined signature is matched. The tape head 10 can be mounted to a Field Replaceable Unit (FRU) (not shown) or the like. The output signals from the system can be used to control precision actuators connected with the FRU or the tape head 10 and adapted to adjust the azimuth of the FRU or tape head 10. For example, the precision actuators can be stepper motors, micromachined actuators, or the like. Another method for adjusting 50 the tape head 10 relative to the transport direction T would be to use precision micrometers to manually adjust the azimuth of the tape head 10 until the predetermined signature is matched by the system or is visually observed on a display as illustrated in FIG. 12. Additionally, the first and second electrical signals ($S_1$ and $S_2$) can be processed by the system to translate the tape head 10 in a direction Z that is transverse to the transport direction T. The translation can be used to center the tape head 10 on the media 20 and/or to position the alignment bands 35 so that they will be centered on the read elements 40.

Figure 17:
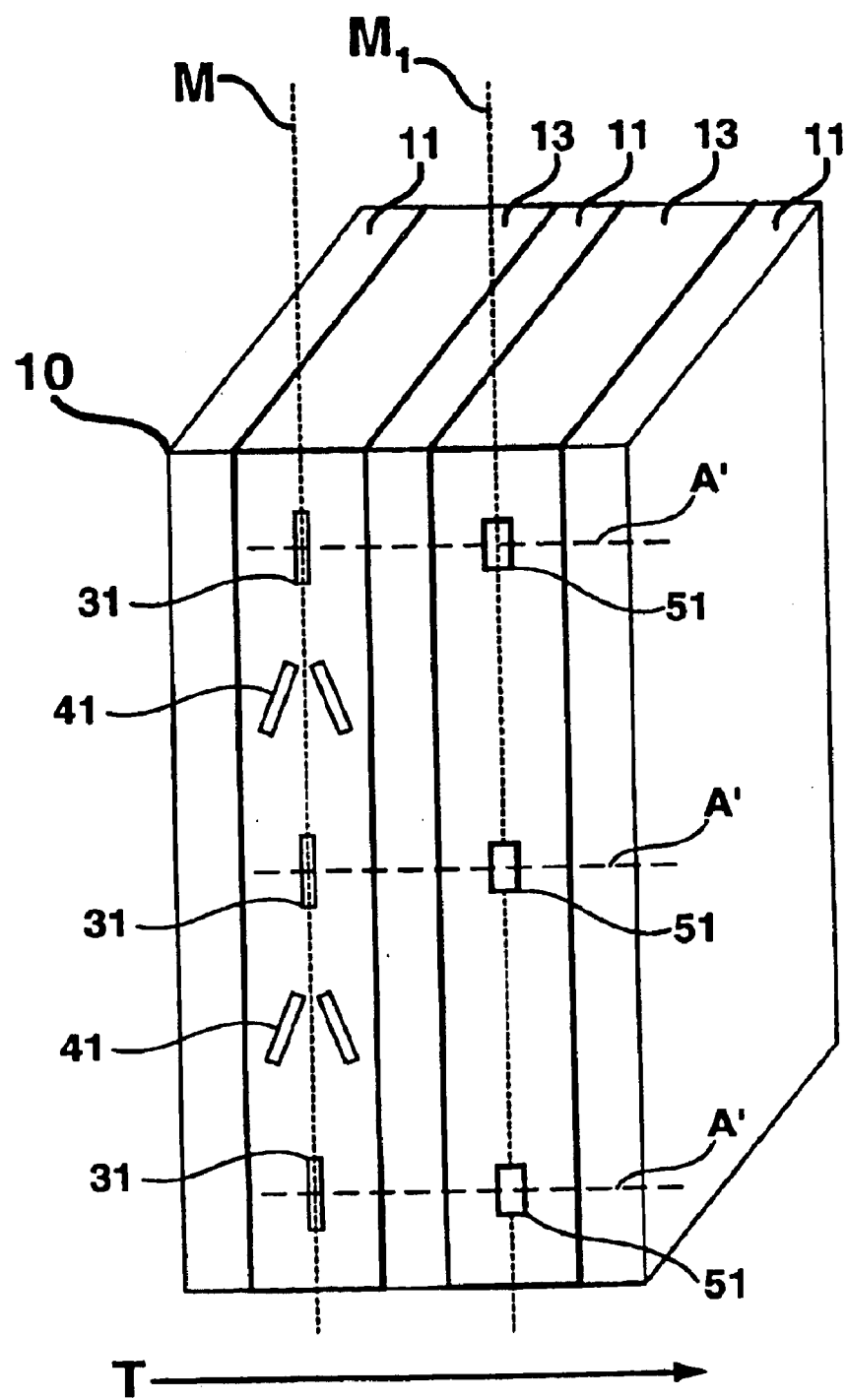
FIG. 17 is plan view of a tape head including read elements that are paired with the alignment elements according to the present invention.

Reference is now made to FIG. 17 in which the tape head 10 includes at least one read element 51 (three are shown) that is cofabricated with the alignment elements 31 and the write elements 41. Each of the read elements 51 is paired with and is aligned (see dashed line A') with a selected one of the alignment elements 31. The read elements 51 are positioned down stream of the alignment elements 31 so that as the alignment transitions 33 are written onto the media 20 (not shown), the alignment transitions 33 pass over the read elements 51 as the media 20 is transported across the tape head 10 in the transport direction T. The read elements 51 are transducers that are adapted to generate a read signal (not shown) in response to the alignment transitions 33 as the alignment transitions 33 pass over the read elements 51. The read signals from the read elements 51 are analyzed to determine if a magnitude of the read signal is indicative of a successfully written alignment transition 33.

Therefore, the read signal can be used to monitor the efficacy of the written alignment transitions 33. If the write current supplied to the alignment elements 31 is insufficient to generate a magnetic field that will result in alignment transitions 33 being easily detected by the first and second read elements 40 of FIG. 12, then the magnitude of the read signal from each of the read elements 51 can be monitored and used to increase the write current supplied to its paired alignment element 31. For instance, if the alignment transitions 33 are not easily detected by the read head 60, then it may be difficult to achieve precision alignment. It is therefore desirable to ensure that the alignment transitions 33 are successfully written onto the media 20 in order to facilitate precision alignment. The magnitude of the read signals can be monitored using an oscilloscope as was described above in reference to FIG. 12 and the write current can be increased until the read signals are indicative of successfully written alignment transitions 33. A system including a CPU or a DSP as was mentioned above can be used to monitor the read signals and to control the write current supplied to the alignment elements. If the magnitude of the read signals is not indicative of successfully written alignment transitions 33, then the write current can be increased to an appropriate level.

In the above embodiments, the alignment elements 31 and the alignment transitions 33 were discussed as they related to aligning the write elements 41 to the preferred orientation β. However, the alignment elements 31 of the present invention are applicable in situations in which there is a need to align a tape head with a direction of transport of a media that is transported across the tape head.

Figure 18A:
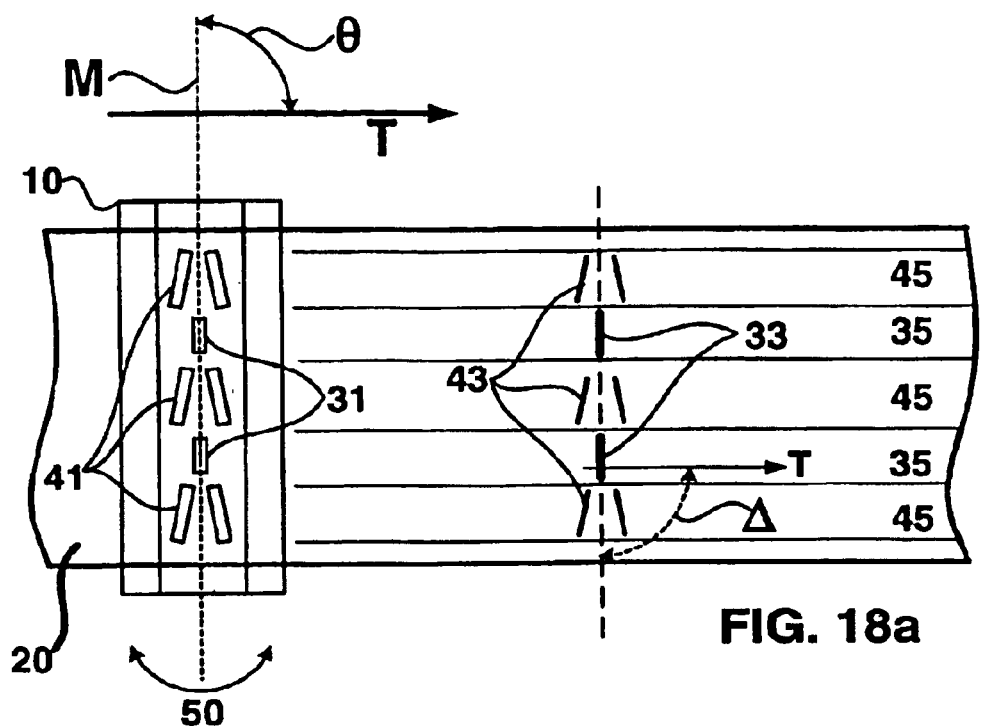
FIGS. 18a and 18b illustrates writing alignment transitions to a media and the subsequent use of that media to precision align a data head to a direction of media transport according to the present invention.
Figure 18B:
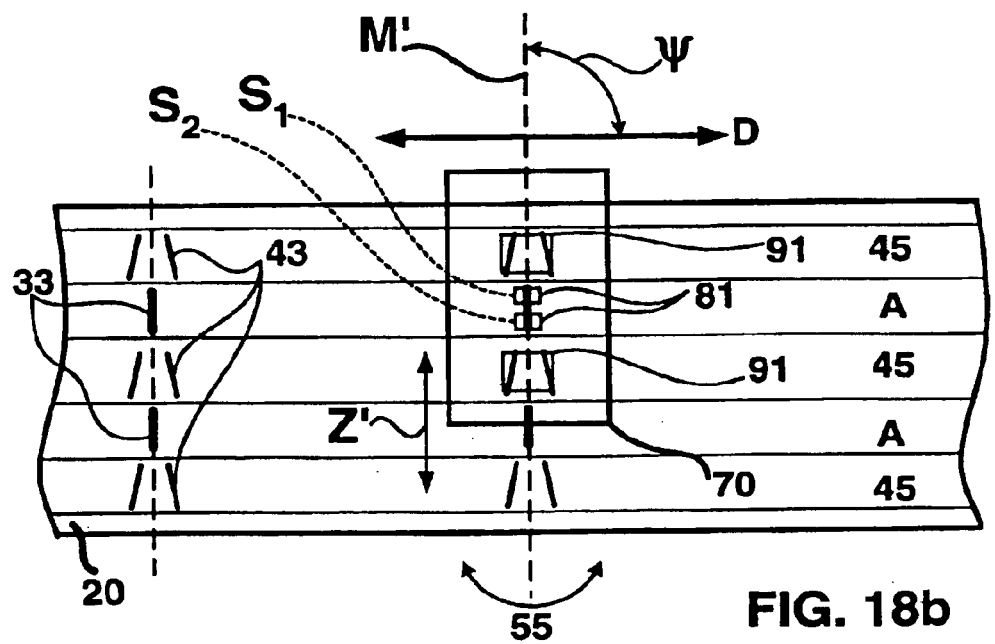
Figure 4:
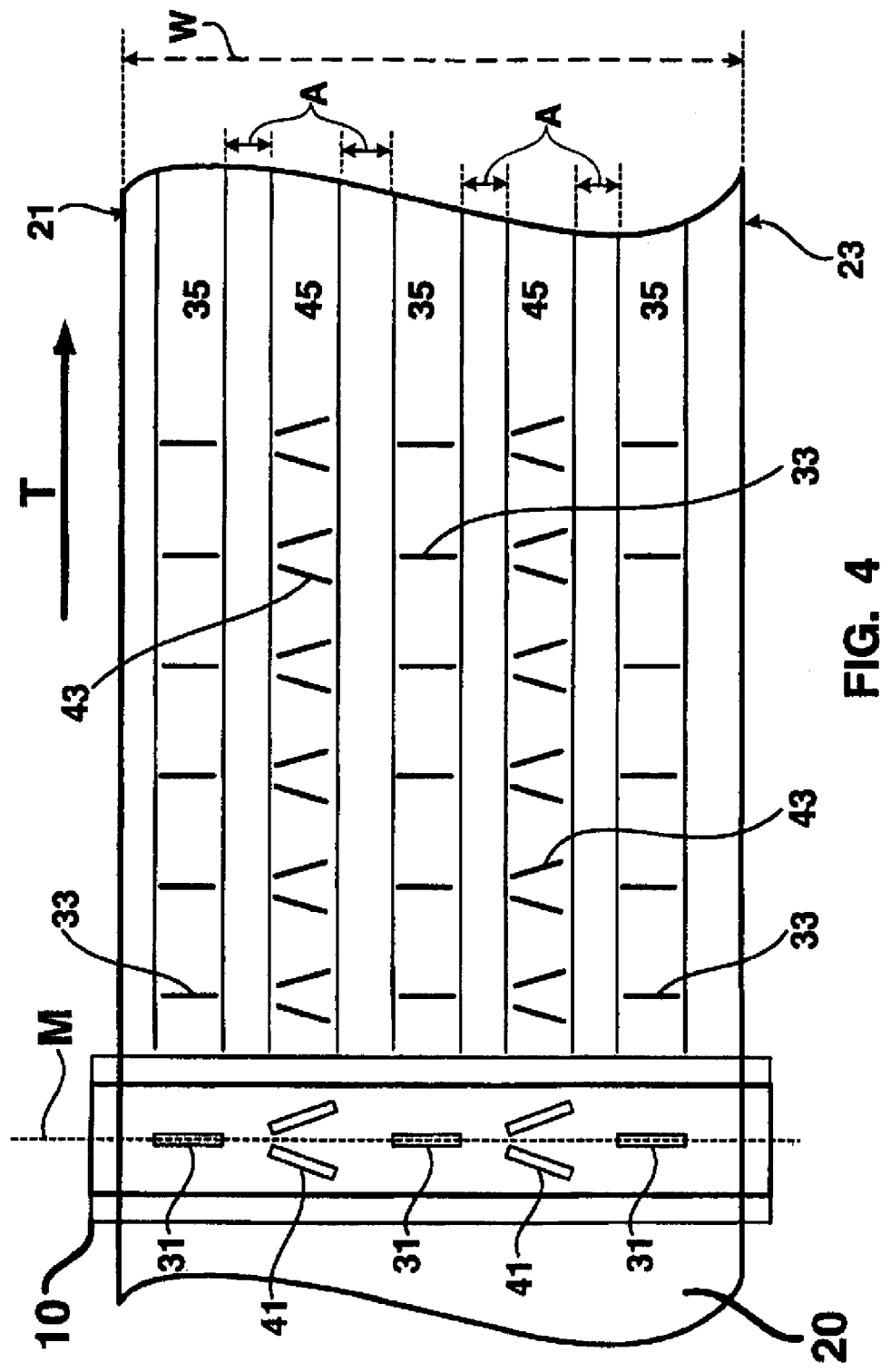

Moreover, in contrast to the above embodiments in which the alignment transitions 33 did not occupy the area A that is predesignated for other uses, the alignment elements 31 can be positioned so that the alignment transitions 33 do occupy the area A as illustrated in FIG. 18b.

Reference is now made to FIG. 18a in which the media 20 has the alignment transitions 33 written in the alignment bands 35. The head-to-media angle θ can be adjusted 50 until the recorded orientation Δ has the preferred alignment with respect to the transport direction T. The process of aligning the tape head 10 using the read head 60 of FIG. 12 or the application of the magnetically reactive material can be used to ensure that the alignment transitions 33 have the preferred alignment. In FIG. 18a, the preferred alignment is when the recorded orientation Δ=90 degrees. Consequently, the alignment transitions 33 are prerecorded on the media 20 with the preferred alignment.

Reference is now made to FIG. 18b in which the media 20 of FIG. 18a is subsequently transported across a data head 70 in a direction of transport D. The direction of transport D can be from left-to-right or vice versa as shown in FIG. 18b. The data head 70 includes a plurality of data elements 81 (two are shown) that are adapted to generate data signals $S_1$ and $S_2$ in response to the alignment transitions 33 that pass over the data elements 81. The data elements 81 are formed along a magnetic axis M'. The data head 70 can be a servo read/write head, for example.

A precision alignment between the data head 70 is obtained by adjusting 55a data-head-to-media angle ψ between the magnetic axis M' and the direction of transport D until the data signals $S_1$ and $S_2$ match a signature that is indicative of the data head 70 having a preferred azimuth angle with respect to the direction of transport D. Preferably, the preferred azimuth angle is when the magnetic axis M' is perpendicular to the direction of transport D (ψ=90 degrees).

The data head 70 can include at least one write element (not shown) that is formed along the magnetic axis M'. When the data head 70 has the preferred azimuth angle ψ with respect to the direction of transport D, both the write element and the data elements 81 are aligned with the direction of transport D (i.e. like the preferred orientation β of the write element 41 of FIG. 5).

The methods described above in reference to FIG. 12 can be used to analyze the data signals ($S_1$ and $S_2$) and adjust 55 the azimuth until the signature is matched. Once the azimuth adjustment is completed, the data elements 81 can overwrite the alignment transitions 33 with new data. In servo writer applications, the written transitions 45 from the write element 41 comprise servo code that is read by servo elements 91 of the data head 70 and can be used translate the data head 70 in a transverse direction Z' to the direction of transport D. Translation of the data head 70 can be used to position the data elements 81 on their respective data bands A. The data elements 81 can be positioned so that two or more of the data elements read a single alignment transition 33 in a single data band A (see FIG. 18b) or the data elements 81 can be positioned so that the data elements 81 read the alignment transitions 33 in separate data bands A (like the configuration shown for the read head 60 of FIG. 12). In either case, a two point measurement is made by the data elements 81. In the first case (FIG. 18b), the data elements 81 sense two points from the same alignment transition 33. In the second case (as in FIG. 12), the data elements 81 sense two points from separate alignment transitions 33 positioned in data bands A that are at the top and bottom of the data head 70. Translation of the data head 70 in the transverse direction Z' can be used to move the data head 70 up and down the width W (see FIG. 4) of the media 20 to position the data elements 81 to read data from different data bands A. Because the servo elements 91 are aligned with the data elements 81, alignment of the data elements 81 with the direction of transport D is also an alignment of the servo elements 91 with the direction of transport D.

The principles of the present invention are also applicable to aligning a data head with a direction of transport of a media. For instance, the data head can be a component in a media drive that is used to store and retrieve data from the media. The media drive can be connected with a computer or a network, for example. Alignment of the data head to the media is accomplished using the alignment transitions 33 of the present invention.

Accordingly, in another embodiment of the present invention, also illustrated in FIG. 18a, the alignment transitions 33 are prerecorded on the media 20 with the preferred alignment in one or more alignment bands 35 as described above in reference to FIG. 18 (for the purposes of this embodiment the write elements 41 and their corresponding write transitions 43 and write bands 45 should be ignored).

In FIG. 18b, the media 20, with the prerecorded alignment transitions 33, is transported across the data head 70 that includes the data elements 81 (two are shown) that are aligned on the magnetic axis M'. The position of the alignment bands 35 can correspond with an area A that is predesignated for other uses such as data or servo code storage. The data elements 81 can read and/or write data in the area A. The data elements 81 are adapted to generate data signal $S_1$ and $S_2$ in response to the alignment transitions 33 that pass over the data elements 81. One or both of the data signals ($S_1$ and $S_2$) are received by an azimuth control unit (not shown) that is connected with the data head 70. The azimuth control unit is operative to adjust 55 the data-head-to-media angle Ψ between the magnetic axis M' and the direction of transport D.

A precision alignment between the data head 70 and the direction of transport D is obtained by adjusting 55 the data-head-to-media angle ψ until either one or both of the data signals ($S_1$ and $S_2$) matches a data signature that is indicative of the data head 70 having a preferred azimuth angle with respect to the direction of transport D. Preferably, the preferred azimuth angle is when the magnetic axis M' is perpendicular to the direction of transport D (ψ=90 degrees). After successfully adjusting 55 the azimuth, the alignment transitions 33 can be subsequently overwritten by the data elements 81. For instance, the data element 81 can generate a magnetic field in response to a data current supplied to the data head 70. The magnetic field is operative to overwrite some or all of the alignment transitions 33 with one or more data transitions (not shown). If the area A is designated for servo code, then overwriting the alignment transitions 33 will not be an option. Instead, the media 20 can be used as part of an one time or a periodic alignment maintenance in which a cartridge containing the media 20 is used to align the data head 70 using the alignment transitions 33 in the area A. After the alignment, that cartridge is removed and replaced by a cartridge containing a media that has servo code prerecorded in the area A.

Additionally, the data signals ($S_1$ and $S_2$) individually or in combination can be used to translate the data head 70 in a transverse direction Z' to the direction of transport D to center the data head 70 on the media 20 and/or to center the data elements 81 on their respective bands (the area A). As mentioned above, a control system receiving the data signals ($S_1$ and $S_2$) can be used to adjust the azimuth 55 and to translate the data head 70 in the transverse direction Z.

In the embodiments described in reference to FIG. 18b above, the data signals ($S_1$ and $S_2$) can be processed using a CPU/DSP as described above in reference to FIG. 12. Similarly, the adjustments to data-head-to media angle ψ and the translation of the data head 70 in the transverse direction Z can be accomplished using the actuators, motors, and the like as described above in reference to FIG. 12.

Figure 13:
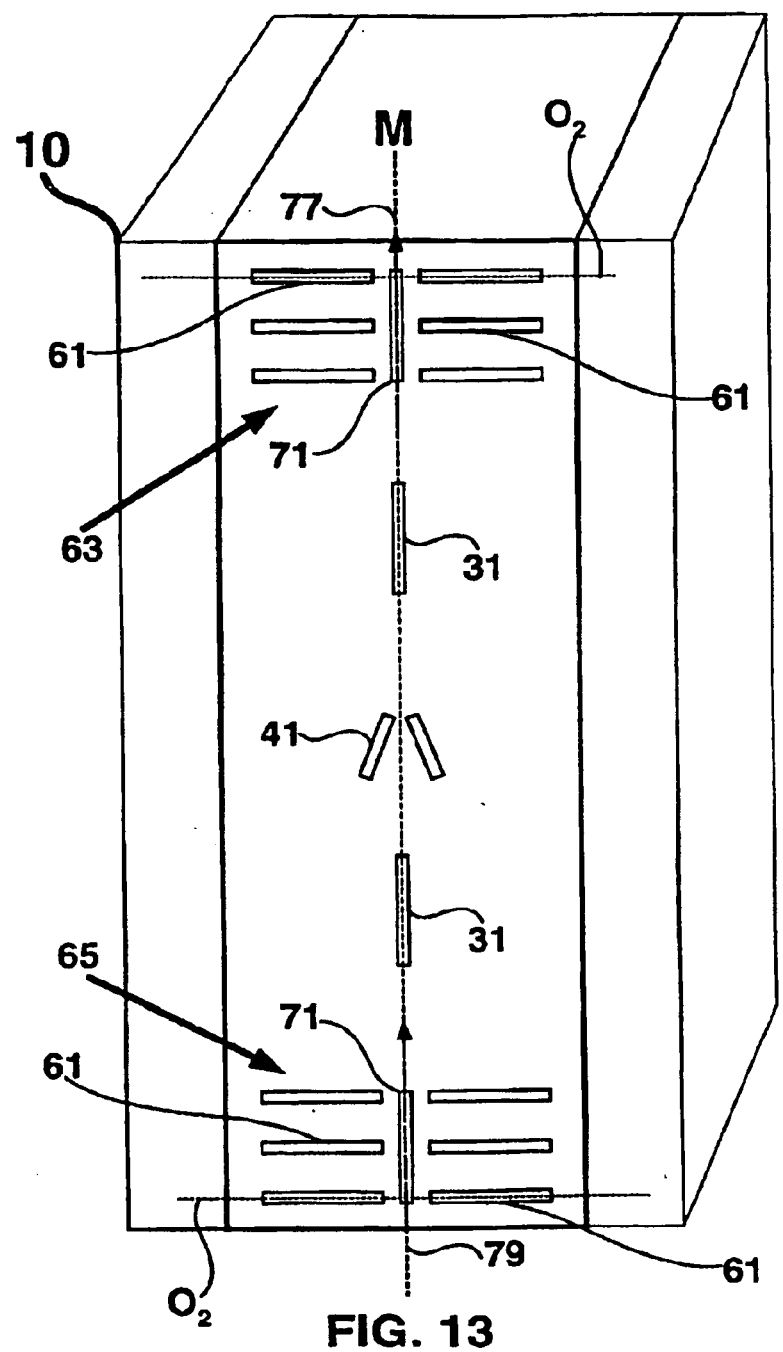
FIG. 13 is a plan view of a tape head including horizontal and vertical elements for gross alignment according to the present invention.

In one embodiment of the present invention, as illustrated in FIG. 13, the tape head 10 includes a first gross alignment pattern 63 positioned at a first end 77 of the magnetic axis M and including at least one horizontal element 61 (six are shown) and a second gross alignment pattern 65 positioned at a second end 79 of the magnetic axis M and including at least one horizontal element 61 (six are shown). The horizontal elements 61 are cofabricated with the alignment elements 31 and the write elements 41 and each of the horizontal elements 61 has a second fixed orientation $O_2$ with respect to the magnetic axis M. Preferably, the second fixed orientation $O_2$ is perpendicular to the magnetic axis. Because the horizontal elements 61 are cofabricated with the alignment elements 31 and the write elements 41 the second fixed orientation $O_2$ can be set with photolithographic precision as was mentioned above in reference to the alignment elements 31 and the write elements 41.

Figure 14:
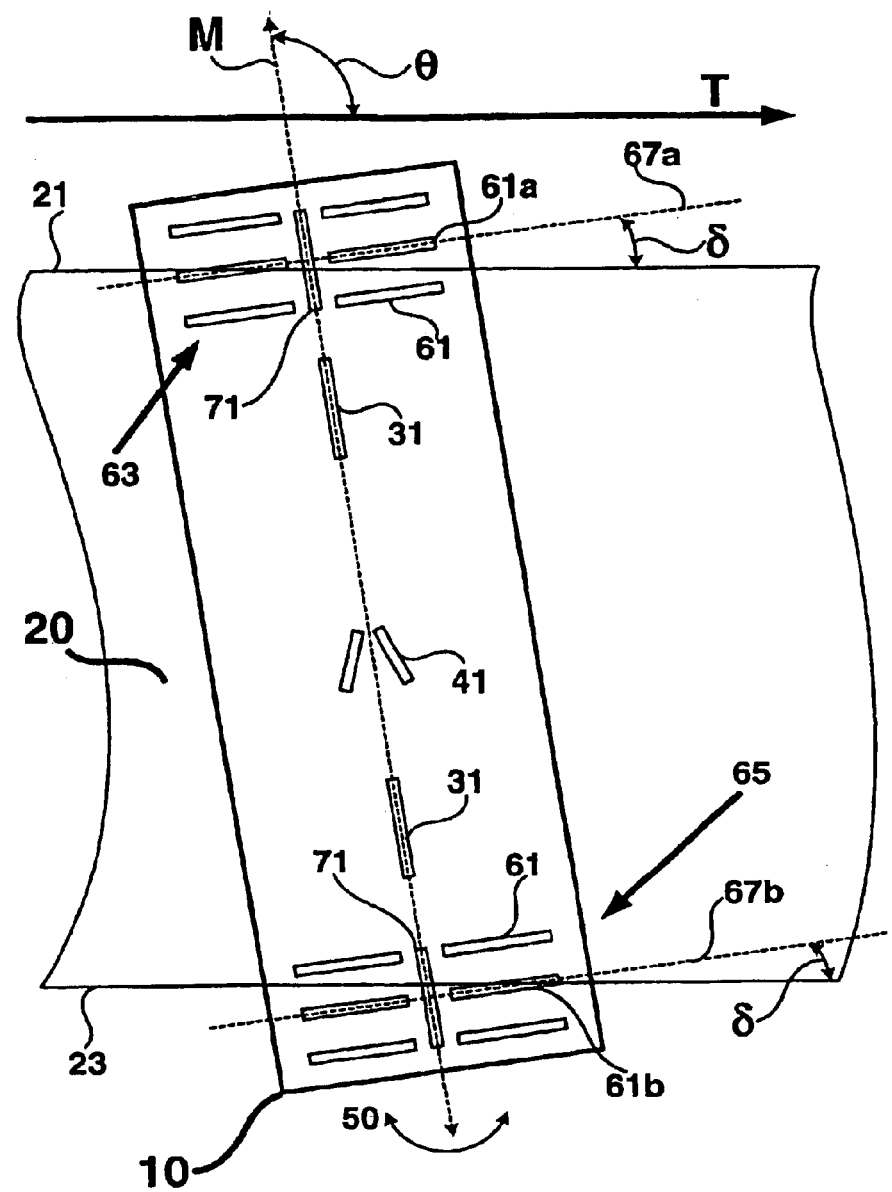
FIGS. 14 and 15 illustrate a tape head having vertical and horizontal elements before and after gross visual alignment according to the present invention.
Figure 15:
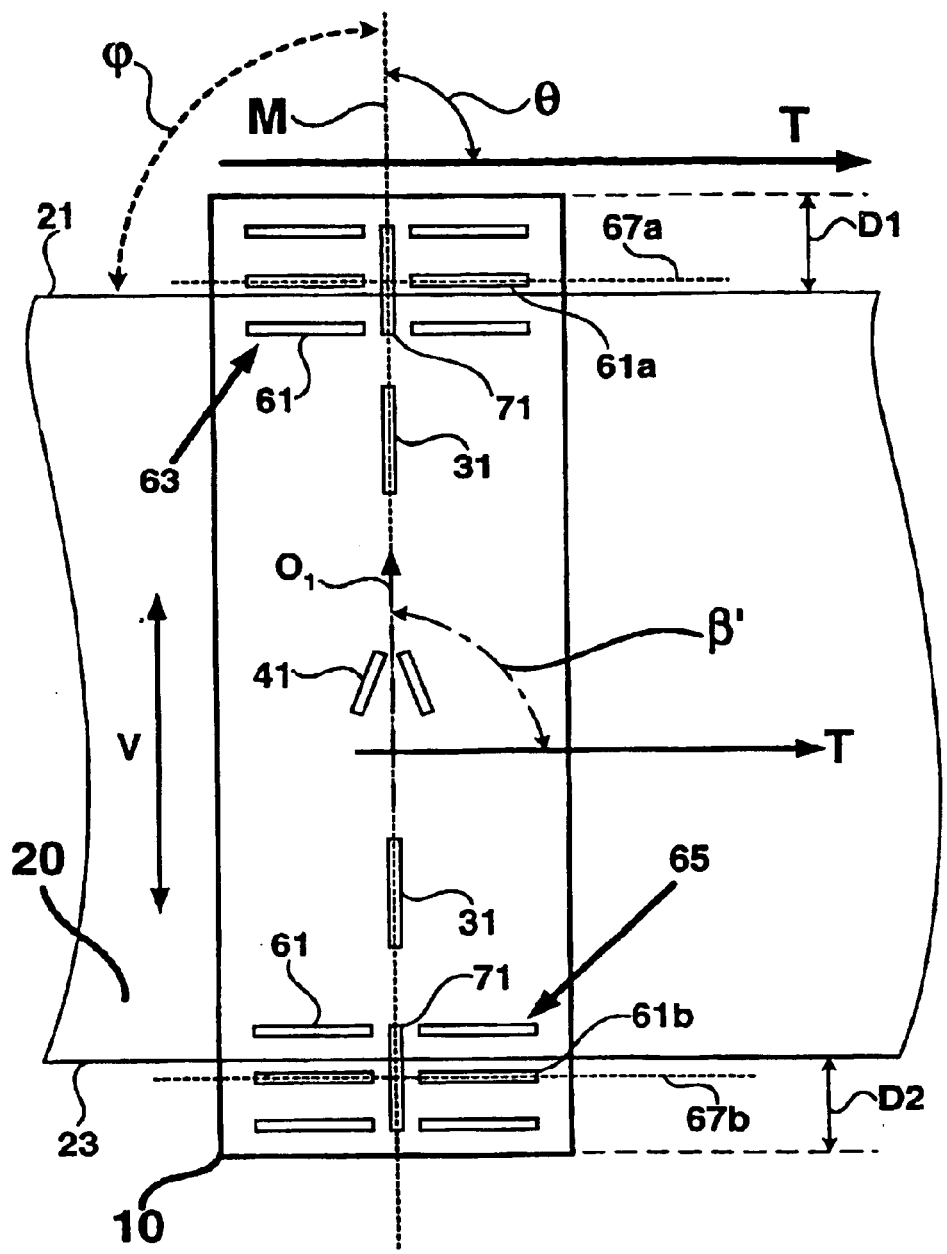

Reference is now made to FIGS. 14 and 15, wherein as the media 20 is transported across the tape head 10 in the transport direction T, the opposed edge 21 is adjacent to first gross alignment pattern 63 and a horizontal element 61*a* is visible outside the opposed edge 21. Similarly, the opposed edge 23 is adjacent to second gross alignment pattern 65 and a horizontal element 61*b* is visible outside the opposed edge 23. A gross visual alignment between the magnetic axis M and the transport direction T is obtained by adjusting 50 the head-to-media angle θ until either one or both of the horizontal elements (61*a*, 61*b*) is parallel to its respective opposed edge (21, 23).

In FIG. 14, the horizontal elements (61*a*, 61*b*) are not parallel to their respective opposed edge (21, 23) as shown by the angle δ between the opposed edge (21, 23) and dashed lines 67*a* and 67*b*. However, in FIG. 15, after adjusting 50 the head-to-media angle θ, both of the horizontal elements (61*a*, 61*b*) are parallel to the opposed edge (21, 23) as illustrated by the dashed lines 67*a* and 67*b*. Because the alignment is a visual one, the parallel relationship between the horizontal elements (61*a*, 61*b*) and the opposed edge (21, 23) is a gross one. As a result, the preferred orientation β is not in near perfect perpendicular alignment with the transport direction T, rather, the write element 41 is approximately in perpendicular alignment with the transport direction T as indicated by the angle 62 '.

If the horizontal elements 61 have micron or submicron features sizes, then it may be necessary to use an optical magnification device such as a microscope or a borescope, for example, to observe the horizontal elements 61 in reference to the opposed edges (21, 23). The gross visual alignment can be accomplished manually or by automated methods that include using machine vision and pattern recognition to achieve the gross visual alignment. The adjustment 50 of the head-to-media angle θ can b accomplished by moving the tape head 10 or the FRU as was discussed above. After the gross visual alignment of the tape head 10, the tape head 10 can be repositioned by moving the tape head 10 up or down (see arrow V) to conceal the visible horizontal elements. The up or down movement V maintains the parallel relationship to the opposed edges (21, 23) that was achieved by the gross visual alignment.

Figure 16A:
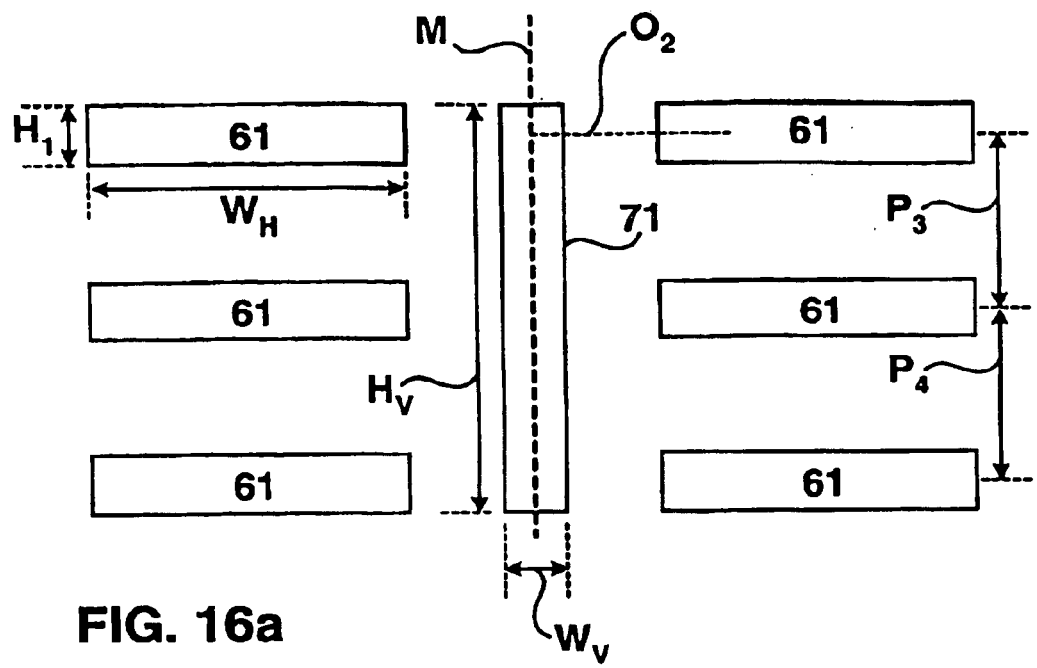
FIGS. 16a and 16b illustrate length, width, and height of horizontal elements and a vertical element according to the present invention.
Figure 16B:
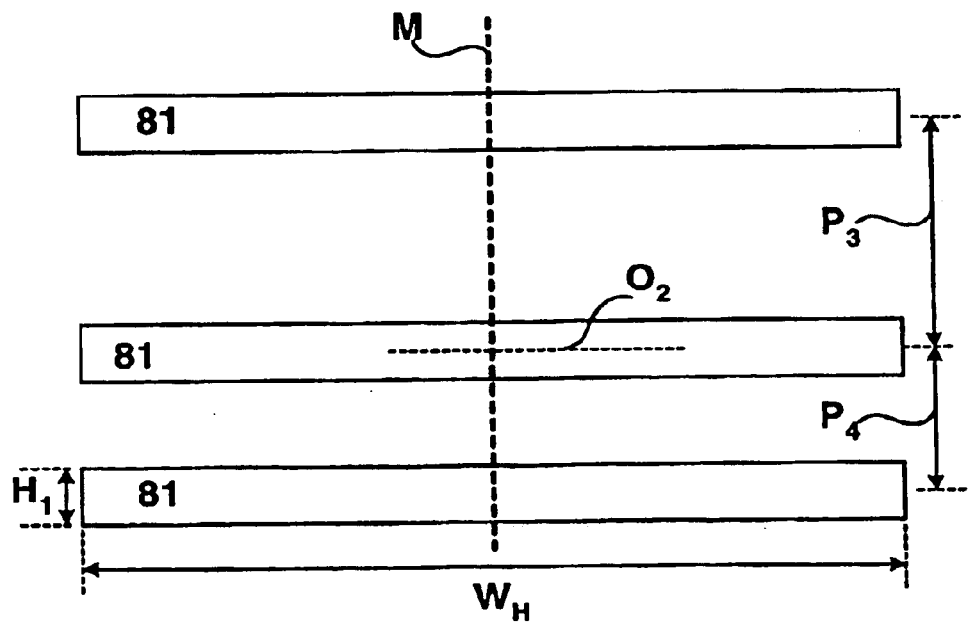

Reference is now made to FIGS. 16*a* and 16*b*, in which the horizontal elements 61 and 81 are spaced apart by a second variable pitch ($P_3$, $P_4$). The second variable pitch ($P_3$, $P_4$) can be in a range from about 20.0 μm to about 200.0 μm.

In a preferred embodiment the second variable pitch ($P_3$, $P_4$) are equal to one another (i.e. $P_3=P_4$); however, the second variable pitch ($P_3$, $P_4$) need not be equal as illustrated in FIG. 16*b* where the pitch $P_3$ is larger than the pitch $P_4$. The horizontal elements 61 can be arranged such that they are paired on either side of the magnetic axis M as in FIG. 16*a* or the horizontal elements 81 can be arranged symmetrically along the magnetic axis as in FIG. 16*b*.

The horizontal elements (61, 81) have a height $H_1$. In one embodiment of the present invention, the height $H_1$ is less than 1.0 μm (i.e. $H_1 < 1.0$ μm). In another embodiment, the height $H_1$ is greater than or equal to 1.0 μm (i.e. $H_1 \leq 1.0$ μm). Preferably, the height $H_1$ for the horizontal elements (61, 81) is identical for all of the horizontal elements; however, the height $H_1$ can vary among the horizontal elements (61, 81). The horizontal elements (61, 81) have a width $W_H$ that can be identical for all of the horizontal elements (61, 81) or can vary among the horizontal elements (61, 81). Preferably, the width $W_H$ is in a range from about 50.0 μm wide to about 1.0 mm wide.

In one embodiment of the present invention, as illustrated in FIGS. 14, 15, 16*a*, and 16*b*, the first and second gross alignment patterns (63, 65) include a vertical element 71 that is cofabricated with the horizontal elements 61 and is colinear with the magnetic axis M. At least a portion of the vertical element 71 in the first gross alignment pattern 63 is visible outside the opposed edge 21 and at least a portion of the vertical element 71 in the second gross alignment pattern 65 is visible outside the opposed edge 23 so that both of the vertical elements 71 serves as an accurate visual indicator of the location of the magnetic axis M relative to the transport direction T. The gross visual alignment between the magnetic axis M and the transport direction T is obtained by adjusting 50 the head-to-media angle θ until either one or both of the horizontal elements 61 are parallel to their respective opposed edges (21, 23) and either one or both of the vertical elements 71 has a preferred edge orientation Φ with their respective opposed edges (21, 23). Preferably, the preferred edge orientation Φ is perpendicular to the opposed edges (21,23).

In another embodiment of the present invention, as illustrated in FIG. 15, the horizontal elements 61 that are visible outside of the opposed edges (21, 23) are used center the tape head 10 visually on the media 20. As was stated above, after gross visual alignment of the tape head 10 using the horizontal elements 61, the tape head 10 can be moved up or down V so that the parallel relationship to the opposed edges (21, 23) is maintained and the tape head 10 can be visually centered on the media 20 such that a distance between the opposed edge 21 and a top portion of the tape head 10 is approximately D1 and a distance between the opposed edge 23 and a bottom portion of the tape head 10 is approximately D2. Therefore, if the tape head 10 is to be symmetrically centered with the media 20, then, D1=D2. On the other hand, if the tape head 10 is not to be symmetric with respect to the media 20, then D1 and D2 may not be approximately equal to each other and the values of D1 and D2 will be application specific.

Additionally, if the above embodiment includes the vertical elements 71, then the vertical elements 71 can be used to ensure that the magnetic axis M of the tape head 10 has the preferred edge orientation Φ with their respective opposed edges (21, 23). For instance, when the preferred edge orientation Φ=90 degrees and the horizontal elements (61*a*, 61*b*) are parallel to the opposed edge (21,23), then the tape head 10 can be moved up or down V to center it on the media 20. The horizontal elements 61 need only be visible outside the opposed edge (21, 23) during the gross visual alignment. Afterward, the tape head 10 can be moved up or down V to conceal the horizontal elements 61 behind the media 20.

Advantages to centering the tape head 10 on the media 20 include making an initial visual centering of the tape head 10 so that the approximate positions of the write elements 41 and the alignment elements 31 relative to the media 20 are known prior to the writing transitions (33, 43) onto the media 20.

Referring to FIG. 16a, the vertical element 71 has a line width $W_V$ and a height $H_V$. The line width $W_V$ can be from about 0.5 μm wide to about 3.0 μm wide. The line height $H_V$ can be from about 20.0 μm to about 200.0 μm. In one embodiment of the present invention, the line width $W_V$ of the vertical element 71 is greater than or equal to the line width $W_2$ of the alignment elements 31 (see FIGS. 9 and 10) (i.e. $W_V \geq W_2$).

One advantage to using the vertical elements 71 is that they are cofabricated with the alignment elements 31 and the write elements 41 and they are colinear with the magnetic axis M. As a result, an improved gross alignment of the write element 41 with the transport direction T is possible because the vertical elements 71 serve as an accurate visual marker for the location of the magnetic axis M relative to the tape head 10 and the opposed edges (21, 23) of the media 20. Therefore, the gross visual alignment of the present invention is not dependent on the shape of the tape head and is superior to the inaccurate visual indicator that is formed on the tape head after the tape head has been manufactured.

The vertical elements 71 and the horizontal elements 61 can be used individually or in combination to effectuate the gross visual alignment of the tape head 10. Manual or automated means can be used to perform the gross visual alignment using the vertical elements 71 and/or the horizontal elements 61 as discussed above.

In another embodiment of the present invention, gross alignment of the tape head 10 is accomplished with the horizontal elements 61 as described above (see FIGS. 13, 14, and 15). The horizontal elements 61 are included in the first and second gross alignment patterns (63, 65) that are positioned at the first and second ends (77, 79) of the magnetic axis M respectively. The horizontal elements 61 are cofabricated with the write elements 41; however, the alignment elements 31 as illustrated in FIGS. 13, 14, and 15 are not included in this embodiment because only a gross visual alignment is desired. The gross visual alignment of the write elements 41 with the transport direction T is accomplished in the same manner as was described above. The vertical elements 71 as described above can be included in this embodiment to effectuate a gross visual alignment individually or in combination with the horizontal elements 61. The preferred edge orientation Φ for the vertical elements 71 is perpendicular to the opposed edges (21, 23). The dimension (width, height, and length) as set forth above in reference to the horizontal elements (61, 81) and the vertical elements 71 and as illustrated in FIGS. 16a and 16b apply to the above embodiment.

The horizontal elements 61 and the vertical elements 71 can be adapted to generate a magnetic field in response to the write current as was mentioned above in reference to the alignment elements 31 and the write elements 41; however, any transitions written onto the media 20 by the horizontal elements 61 will be supplanted (i.e. overwritten) by a subsequent write current pulse. Similarly, any transitions written onto the media 20 by the vertical elements 71 will be substantially overwritten by the transitions from the horizontal elements 61. Typically, the portion of the tape head 10 that is proximate to the opposed edges (21, 23) is not in contact with the media 20 as the media 20 is transported across the tape head 10 due to media liftoff at the opposed edges (21, 23). That liftoff results in the media 20 being a variable distance away from the tape head 10 such that the magnetic fields from the horizontal elements 61 and the vertical elements 71 are substantially reduced and the transitions that are written onto the tape are either poorly defined or almost nonexistent because the magnetic field strength is too low to successfully write a transition onto the media 20.

As described herein, the alignment elements 31, the horizontal elements 61 and 81, and the vertical elements 71 can be fabricated using techniques known to those skilled in the art of tape heads and photolithography for fabricating the write elements 41 the read elements 51. The tape head 10 can be made from a ferrite-glass-ferrite sandwich as illustrated in FIGS. 3 and 17 where the tape head 10 includes a glass layer 13 that is sandwiched between two ferrite layers 11. Preferably, the glass layer 13 has a flat surface upon which the elements: the write elements 41; the alignment elements 31; the read elements 51; the horizontal elements (61, 81); and the vertical elements 71 are cofabricated. The tape head 10 can be batch fabricated from a sheet of ferrite-glass-ferrite material and then each tape head 10 can be cut from that sheet using a saw or the like.

A flat surface is desirable for the glass layer 13 so that patterns for the elements can be formed using photolithographic processes that are well known in the microelectronics art. The gaps which form the elements can be made from air, photoresist, or some other non-magnetic material. The write element 41 can have a shape that includes but is not limited to a half-chevron pattern, a full-chevron pattern, a half-diamond pattern, and a full-diamond pattern, for example (see FIGS. 3, 3a, 3b, and 3c respectively). The shape for the write element 41 is not to be construed as being limited to the shapes illustrated and described herein, other shapes can be used and the application as well as the ability of a read transducer to successfully read a transition written by the write element 41 will determine the shape of the write element 41. Although a curved surface can be used for the glass layer 13, it is far more difficult to form a consistent pattern for the elements on a curved surface. Additionally, forming consistent patterns on a curved surface requires more complex and more expensive equipment than is necessary for forming the patterns on a flat surface. Conventional photolithography devices can be used to form the patterns for the elements of the present invention.

The tape head 10 of the present invention can be a closed-loop servo head, a thin-film magnetoresistive head, and a thin-film magnetoresistive servo-write head, or the like. Although for applications such as LTO, for example, the feature sizes for the elements will be in the micron and submicron range, the principles of the present invention apply to any tape head in which it is desired to align a transducer element of the tape head with a transport direction of a media or to align the tape head itself to the direction of media transport.

A method of making an exemplary tape head 10 and for forming the patterns for the elements (31, 41, 51, 61, 71, and 81) is described in U.S. Pat. No. 6,018,444, to Beck et al, "Batch Fabricated Servo Write Head Having Low Write-Gap Linewidth Variation", issued on Jan. 25, 2000, and is incorporated herein by reference as though set forth in its entirety. Such embodiment is exemplary and other technologies may be utilized in accordance with the present invention.

Although several embodiments of the present invention have been disclosed and illustrated, the invention is not limited to the specific forms or arrangements of parts so described and illustrated. The invention is only limited by the claims.

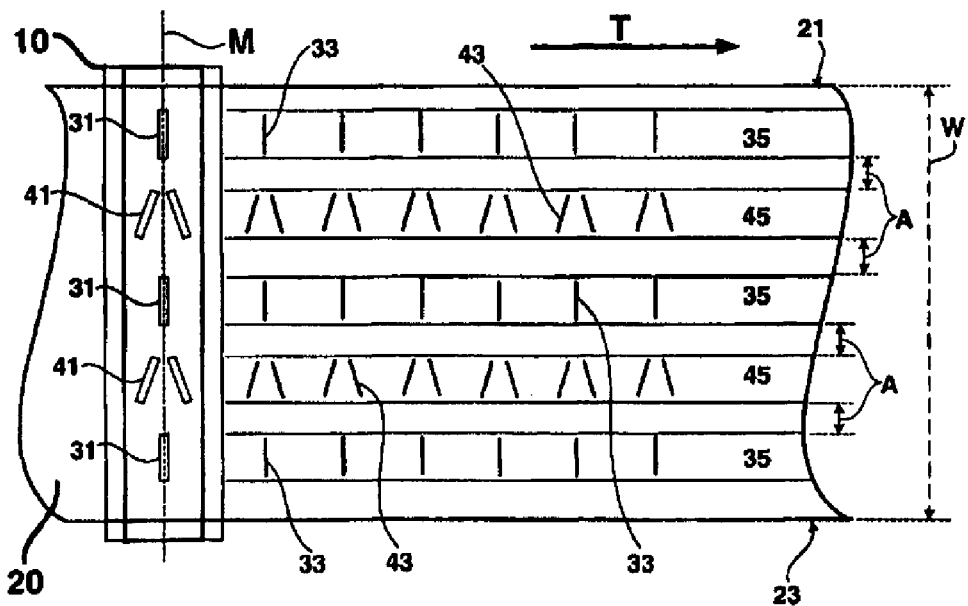

What is claimed is:

1. A media including a pair of opposed edges, the media is transported across a tape head in a transport direction during a manufacturing of the media and the tape head including a plurality of alignment elements and a plurality of write elements, the media further comprising:

a plurality of alignment transitions that are prerecorded on the media by the alignment elements during the manufacturing of the media and prior to a writing of a data on the media, the alignment transitions including a recorded orientation with respect to a selected one of the opposed edges or the transport direction, and the alignment transitions define a plurality of alignment bands that are spaced apart from each another; and a plurality of written transitions that are prerecorded on the media by the write elements during the manufacturing of the media and prior to the writing of the data on the media, the written transitions define a plurality of write bands that are spaced apart from each other, and wherein the alignment transitions are operative to allow the write elements on the tape head to be precisely aligned with a preferred orientation with respect to the transport direction.

2. The media as set forth in claim 1, wherein the recorded orientation of the alignment transitions is perpendicular to a selected one of the transport direction or the opposed edges.

3. The media as set forth in claim 1, wherein the alignment bands and the write bands are spatially separated from each other on the media.

4. The media as set forth in claim 1, wherein the alignment bands, and the write bands are parallel to the transport direction.

5. The media as set forth in claim 1, wherein the alignment transitions in adjacent alignment bands are colinear with one another when the recorded orientation is perpendicular to the transport direction.

6. The media as set forth in claim 1, wherein the alignment transitions in adjacent alignment bands are positioned along parallel axes and the alignment transitions are colinear with one another when the recorded orientation is perpendicular to the transport direction.

7. The media as set forth in claim 1, wherein the written transitions comprises servo code that is prerecorded on the media in the write bands by the write elements during the manufacturing of the media.

8. The media as set forth in claim 7, wherein the write band comprises a servo band.

9. The media as set forth in claim 8, wherein the servo band is parallel to the transport direction.

10. The media as set forth in claim 1 and further comprising an area on the media that is predesignated for other uses.

11. The media as set forth in claim 10, wherein the area on the media that is predesignated for other uses comprises plurality of data bands and the data is written in the data bands after the manufacturing of the media.

12. The media as set forth in claim 10, wherein the alignment transition are written in the area on the media that is predesignated for other uses.

13. The media as set forth in claim 10, wherein the area on the media that is predesignated for other uses is defined by a format specification for data storage on a magnetic tape.

14. The media as set forth in claim 13, wherein the format specification is selected from the group consisting of a Liner Tape-Open format, an ULTRIUM format, a TRAVAN format, and a MAGSTAR MP 3570 format.

15. The media as set forth in claim 13, wherein a position of the alignment bands and the write bands relative to each other on the media is defined by the format specification.

16. The media as set forth in claim 13, wherein the area on the media that is predesignated for other uses comprises a plurality of data bands, the data is written in the data bands after the manufacturing of the media, and a position of the alignment bands, the write bands, and the data bands relative to each other on the media is defined by the format specification.

17. The media as set forth in claim 13, wherein the area on the media that is predesignated for other uses comprises a plurality of servo bands and servo code is written into the servo bands during the manufacturing of the media, and the alignment transitions that are written on the media during the manufacturing of the media do not overwrite and do not interfere with the servo code in the servo bands.

* * * * *

UNITED STATES PATENT AND TRADEMARK OFFICE
CERTIFICATE OF CORRECTION

PATENT NO. : 6,898,045 B2
APPLICATION NO. : 10/723757
DATED : May 24, 2005
INVENTOR(S) : Beckl et al.

It is certified that error appears in the above-identified patent and that said Letters Patent is hereby corrected as shown below:

THE TITLE PAGE, SHOWING AN ILLUSTRATIVE FIGURE, SHOULD BE DELETED AND SUBSTITUTE THERFOR THE ATTACHED TITLE PAGE.

DELETE DRAWING SHEET 4 AND SUBSTITUTE THERFOR THE DRAWING SHEET CONSISTING FIG 4 AS SHOWN ON THE ATTACHED PAGE.

Signed and Sealed this

Nineteenth Day of May, 2009

JOHN DOLL
*Acting Director of the United States Patent and Trademark Office*

(12) United States Patent
Beck et al.

(10) Patent No.: US 6,898,045 B2
(45) Date of Patent: May 24, 2005

(54) MEDIA WITH PRE-RECORDED ALIGNMENT TRANSITIONS

(75) Inventors: Patricia A. Beck, Palo Alto, CA (US); George M. Clifford, Jr., Los Altos Hills, CA (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 14 days.

(21) Appl. No.: 10/723,757

(22) Filed: Nov. 26, 2003

(65) Prior Publication Data

US 2004/0109257 A1 Jun. 10, 2004

Related U.S. Application Data

(62) Division of application No. 09/691,646, filed on Oct. 17, 2000, now Pat. No. 6,700,729.

(51) Int. Cl.[7] .................. G11B 20/20; G11B 5/00; G11B 5/584
(52) U.S. Cl. ..................... 360/76; 360/77.12
(58) Field of Search ............... 360/72.1, 72.3, 360/74.1, 74.4, 75, 76, 77.01, 77.12, 78.01, 78.02, 78.03

(56) References Cited

U.S. PATENT DOCUMENTS

| | | | |
|---|---|---|---|
| 6,236,525 B1 | * | 5/2001 | Cates et al. ............. 360/51 |
| 6,430,008 B1 | * | 8/2002 | Trabert et al. ........... 360/317 |
| 6,433,949 B1 | * | 8/2002 | Murphy et al. .......... 360/75 |

* cited by examiner

Primary Examiner—David Hudspeth
Assistant Examiner—Jason Olson
(74) Attorney, Agent, or Firm—Trueman H. Denny, III

(57) ABSTRACT

A device for precision alignment of a write element of a tape head to a transport direction of a media that is transported across the tape head is disclosed. The tape head includes at least one alignment element that is cofabricated with the write element so that both the write element and the alignment element have a fixed orientation with respect to a magnetic axis of the tape head. The alignment element and the write element can be fabricated on the tape head using standard microelectronic photolithographic processes. Preferably, the tape head includes a plurality of alignment elements. Those alignment elements are operative to write alignment transitions onto the media. The alignment transitions can be observed to determine if they are indicative of the write element having a predetermined orientation with respect to the transport direction. A read transducer can be used to generate signals from the alignment transitions and those signals can be analyzed to determine if the predetermined orientation of the write element has been achieved. The tape head can include horizontal and/or vertical elements for a gross visual alignment of the tape head to the media. The alignment transitions can be read by a data element of a separate data head. A signal from the data element can be used to adjust the azimuth of the data head with respect to a direction of transport. In servo writer applications where servo code is prerecorded on the media, the alignment transitions can be used to align the write elements of a servo write head to the transport direction of the media so that inter band skew between adjacent servo bands is significantly reduced.

17 Claims, 16 Drawing Sheets